(12) United States Patent
Mohr et al.

(10) Patent No.: US 11,447,902 B2
(45) Date of Patent: Sep. 20, 2022

(54) MULTI-COMPONENT FIBERS WITH IMPROVED INTER-COMPONENT ADHESION

(71) Applicant: Berry Global, Inc., Evansville, IN (US)

(72) Inventors: David Larry Mohr, Charlotte, NC (US); Ralph A. Moody, III, Mooresville, NC (US)

(73) Assignee: BERRY GLOBAL, INC., Evansville, IN (US)

( * ) Notice: Subject to any disclaimer, the term of this patent is extended or adjusted under 35 U.S.C. 154(b) by 284 days.

(21) Appl. No.: 16/189,978

(22) Filed: Nov. 13, 2018

(65) Prior Publication Data

US 2019/0145032 A1   May 16, 2019

Related U.S. Application Data

(60) Provisional application No. 62/585,128, filed on Nov. 13, 2017.

(51) Int. Cl.
  *D04H 1/4291* (2012.01)
  *D04H 3/147* (2012.01)
  (Continued)

(52) U.S. Cl.
  CPC ......... *D04H 1/4291* (2013.01); *B65B 55/027* (2013.01); *B65B 55/10* (2013.01);
  (Continued)

(58) Field of Classification Search
  CPC ...... D04H 1/4291; D04H 3/147; D04H 3/007; D04H 1/4374; D04H 1/44; B65B 55/027;
  (Continued)

(56) References Cited

U.S. PATENT DOCUMENTS

| 5,308,691 A | 5/1994 | Lim et al. |
| 5,405,682 A | 4/1995 | Shawyer et al. |

(Continued)

FOREIGN PATENT DOCUMENTS

| CN | 103582727 B | 7/2016 |
| EP | 1344857 A1 | 9/2003 |

(Continued)

OTHER PUBLICATIONS

Second Written Opinion of PCT/US2018/060851 dated Oct. 8, 2019, all enclosed pages cited.

(Continued)

*Primary Examiner* — Elizabeth C Imani
(74) *Attorney, Agent, or Firm* — Burr & Forman LLP

(57) ABSTRACT

Nonwoven fabrics are provided that include at least a first nonwoven layer. The first nonwoven layer includes multi-component fibers densely arranged and compacted against one another. The multi-component fibers comprise at least a first component comprising a first polymeric material including a first polyolefin and a second component comprising a second polymeric material including a second polyolefin, in which the first polymeric material is different than the second polymeric material. The first polymeric material, the second polymeric material, or both include a compatibilizer comprising a copolymer having a comonomer content including (i) at least 10% by weight of the compatibilizer of a first monomer corresponding to the first polyolefin and (ii) at least 10% by weight of the compatibilizer of a second monomer corresponding to the second polyolefin.

20 Claims, 13 Drawing Sheets

(51) Int. Cl.
*D04H 3/007* (2012.01)
*D01F 1/10* (2006.01)
*D01F 8/06* (2006.01)
*D04H 1/4374* (2012.01)
*D04H 1/44* (2006.01)
*B32B 5/26* (2006.01)
*B32B 5/14* (2006.01)
*B65B 55/02* (2006.01)
*B65B 55/10* (2006.01)
*B65D 65/40* (2006.01)

(52) U.S. Cl.
CPC .............. *B65D 65/40* (2013.01); *D01F 1/10* (2013.01); *D01F 8/06* (2013.01); *D04H 1/4374* (2013.01); *D04H 1/44* (2013.01); *D04H 3/007* (2013.01); *D04H 3/147* (2013.01); *B32B 5/14* (2013.01); *B32B 5/266* (2021.05); *B32B 2439/80* (2013.01)

(58) Field of Classification Search
CPC .......... B65B 55/10; B65D 65/40; D01F 1/10; D01F 8/06; D03D 1/0035; D03D 9/00; D03D 13/008; D03D 15/0027; A43B 7/32; A43B 13/02; A43B 17/003; B32B 27/12; B32B 5/266; B32B 2439/80; B32B 5/14; D10B 2331/021; D10B 2401/063; D10B 2401/16; D10B 2501/043; Y10S 428/911
See application file for complete search history.

(56) References Cited

U.S. PATENT DOCUMENTS

| | | | |
|---|---|---|---|
| 5,843,057 A | 12/1998 | McCormack | |
| 6,417,121 B1 | 7/2002 | Newkirk et al. | |
| 7,790,641 B2 * | 9/2010 | Baker, Jr | D04H 3/14 442/361 |
| 2003/0207642 A1 | 11/2003 | Myers et al. | |
| 2007/0054579 A1 | 3/2007 | Baker, Jr. et al. | |
| 2016/0333509 A1 | 11/2016 | Novarino et al. | |

FOREIGN PATENT DOCUMENTS

| | | |
|---|---|---|
| EP | 1944395 A2 | 7/2008 |
| TW | 255927 B | 9/1995 |
| TW | 513344 B | 12/2002 |
| WO | 199802302 A1 | 1/1998 |
| WO | 200114621 A1 | 3/2001 |
| WO | 2013153267 A1 | 10/2013 |
| WO | 2017091669 A1 | 6/2017 |
| WO | 2017100175 A1 | 6/2017 |

OTHER PUBLICATIONS

International Search Report and Written Opinion of PCT/US2018/060851 dated Mar. 27, 2019, all enclosed pages cited.
Office Action dated Jan. 9, 2020 in corresponding Taiwan Patent Application No. 107140112, all enclosed pages cited.
English translation of Office Action dated Jan. 9, 2020 in corresponding Taiwan Patent Application No. 107140112, all enclosed pages cited.
International Preliminary Report on Patentability dated Jan. 9, 2020 in corresponding international application No. PCT/US2018/060851, all enclosed pages cited.
Office Action (with English translation) dated Aug. 21, 2020 in corresponding Taiwan Patent Application No. 107140112, all enclosed pages cited.
Office Action (with English translation) dated Aug. 27, 2021 in corresponding Taiwan Patent Application No. 107140112, all enclosed pages cited.

* cited by examiner

MULTI-COMPONENT FIBERS WITH IMPROVED INTER-COMPONENT ADHESION

CROSS-REFERENCE TO RELATED APPLICATIONS

This application claims priority under 35 U.S.C. § 119(e) to U.S. Provisional Application No. 62/585,128, filed Nov. 13, 2017, which is expressly incorporated by reference herein in its entirety.

TECHNICAL FIELD

Embodiments of the presently-disclosed invention relate generally to multi-component fibers having improved inter-component adhesion and nonwoven fabrics including the same. Embodiments of the presently-disclosed invention also generally relate to the use of such multi-component-containing nonwoven fabrics as a breathable barrier material in sterilized and/or sterilizable packages.

BACKGROUND

Sterilizable medical packaging is a critical component in the prevention of contamination to the medical environment. Typically, clean but not sterilized articles (e.g., syringes, tube sets, instruments, surgical gowns, drapes, etc.) are placed into sterilizable packaging then sterilized by various methods, such as by the use of sterilizing gas (e.g., ethylene oxide). Packages that are sterilized with gas typically have as part of the packaging system a breathable barrier material that allows introduction and evacuation of the sterilizing gas but protects the contents from dirt and bacteriological contamination. For example, a sterilization method with ethylene oxide consists of placing the sterilizable packages (e.g., in sealed form with the medical item sealed therein) in a chamber and subjecting it to a cycle in which the following general steps may be performed: (1) the air is pumped out of the chamber; (2) the chamber is allow to be filled with a sterilization gas formulation (e.g., rich in ethylene oxide); and then (3) after a pre-determined period of time, this sterilization gas is pumped out of the chamber. This cycle may be repeated a few times before the sterilization gas used is replaced with air prior to removing the package from the chamber. The sterilized package is then stored until needed. When the medical device is needed, the sterilized package can be opened at the point of use in a controlled manner to allow aseptic presentation of the contents (e.g., medical device) to the medical personnel that will use it.

To function well in this type sterilization process the package needs to have a fraction of its surface covered by a breathable material (e.g., membrane) that is permeable to gas. Important features of such breathable materials used for medical packaging and other similar applications include adequate breathability to allow sterilization by rapid infiltration and removal of gas like ethylene oxide, adequate microbial barrier properties to protect the contents from contamination, adequate physical properties to survive transport and storage, and clean peel properties for aseptic presentation to the point of use. It is critical, for instance, that when the packaging is opened at the point of use, a clean peel surface must be achieved so that the point of use is not contaminated by debris from the package of the opened seal. The breathable material (e.g., membrane) can be used as a window in a flexible package or as lid or flexible layer of a rigid package that can be peeled off in order to open the package at the point of use. While being peeled away an important characteristic of such breathable material is to not produce lint, particulates, or debris that could contaminate the contents or the environment. In this regard, one has to remember that such contaminants could undesirably enter, for example, a body through an open wound. The creation of a clean peel surface, therefore, is particularly desirable.

Present materials for such applications have various characteristics for peel appearance. Papers used for the breathable material (e.g., breathable barrier) in particular have the tendency to tear off an outer layer of the paper to leave a rough surface and potentially creating loose wood fibers (also called lint by some). These loose fibers can be a source of contamination, which has been seen as a negative of this solution. Such approaches, therefore, have been constrained to use in less critical applications or require the use of specific adhesives that will have low bond strength against the other surfaces in order to maintain the paper:glue interface intact to minimizing the damage to the paper in order to mitigate release of loose wood fibers. This particular approach, however, facilitates the negative possibility that the seal fails during handling of the package due to low peel strength. Other spunbond or flash-spun olefin products have many good properties but can create fibrous debris when peeled or delaminate when peeled. Flash-spun olefin product such as Tyvek and sold by Dupont de Nemours has attempted to minimize this issue by limiting the window of operation used for sealing and therefore may not form the optimum bond. Another approach has been, like for paper, to coat Tyvek with selected adhesives that are likely to fail in the bond with the other surface. This is an expensive solution and may also suffer from poor peel strength. Additionally, this adhesive approach can be a cause of debris (i.e., the adhesive itself) that contaminants an environment. Such approach also exhibits a reduced rate of exchange through the product during the sterilization cycles. Finally, even a discontinuous layer of adhesive may reduce the breathability of Tyvek if it is applied to its entire surface.

One method developed in the past to create a breathable barrier that has been pursued involves producing a spunbond polyolefin bicomponent fiber web having a sheath/core configuration and then reducing the porosity of the web by using high pressure smooth calendaring. Such an approach, however, provides a material that when sealed to a polymeric sealing material (e.g., film) to create a breathable package and subsequently peeled to open the package provides an undesirably noticeable amount of debris due to the pull-out of fibers and/or pull-out of sheath components that have separated from the core component of the bicomponent fibers at the seal area or adjacent to the sealed area. Such debris at the peeled seal is unacceptable. FIG. 1, for instance, shows a scanning electron microscope (SEM) image of undesirable fiber peel (e.g., fiber pull-out and separation of sheath components from core components) from such an approach in which the sheath component comprises a polyethylene and the core component comprised a polypropylene. FIG. 2 shows a cross-sectional SEM image of bicomponent fibers having a polyethylene sheath and a polypropylene core, in which the sheath component has separated from the core component due to mechanical stresses and strains. The separation of the sheath component undesirably presents a source of debris (e.g., contamination) in packaging applications (e.g., sterilized packaging applications).

Therefore, there remains a need in the art for a breathable polymeric barrier material (e.g., a nonwoven fabric) that provides one or more of the following: satisfactory resistance to microbial penetration; high rate of gaseous exchange that may optionally be free of adhesive; can be thermally bonded to films (e.g., packaging films to provide a seal) on rigid or semi-rigid container surfaces; and minimal generation of contaminant when the package is opened. There also remains a need for a breathable polymeric barrier material (e.g., a nonwoven fabric) that has enough inner integrity to be used with adhesive with good adhesive strength that produces adequate peel strength and will still fail at the adhesive:counter surface interface; leaving the breathable polymeric barrier material (e.g., a nonwoven fabric) surface mostly intact (e.g., no to minimal debris/lint).

SUMMARY OF INVENTION

One or more embodiments of the invention may address one or more of the aforementioned problems. Certain embodiments according to the invention provide a breathable material (e.g., breathable barrier material) in the form of a nonwoven fabric. In accordance with certain embodiments of the invention, for example, the nonwoven fabric may comprise at least a first nonwoven layer (e.g., one or more nonwoven layers) comprising multi-component fibers densely arranged and compacted against one another to form, for example, a substantially smooth outer surface on at least a first side of the nonwoven fabric. In accordance with certain embodiments of the invention, the densely arranged and compacted multi-component fibers may be described as defining a structure of a microporous film (e.g., at least on the outermost surface of the nonwoven fabric) that permits gas to pass therethrough while also providing a barrier to liquids and microbial penetration. In accordance with certain embodiments of the invention, the multi-component fibers may comprise at least a first component comprising a first polymeric material including a first polyolefin (e.g., polyethylene) and a second component comprising a second polymeric material including a second polyolefin (e.g., polypropylene), in which the first polymeric material is different than the second polymeric material. In accordance with certain embodiments of the invention, the first polymeric material, the second polymeric material, or both may comprise a compatibilizer comprising a copolymer having a comonomer content including (i) at least 10% by weight of the compatibilizer of a first monomer (e.g., ethylene monomer) corresponding to the first polyolefin and (ii) at least 10% by weight of the compatibilizer of a second monomer (e.g., polypropylene) corresponding to the second polyolefin. In accordance with certain embodiments of the invention, the compatibilizer provides a greater adhesion between the first and second components.

In another aspect, the present invention provides a method of forming a nonwoven fabric comprising forming or providing at least one nonwoven layer including a first nonwoven layer comprising multi-component fibers. The multi-component fibers comprise at least a first component comprising a first polymeric material including a first polyolefin and a second component comprising a second polymeric material including a second polyolefin, in which the first polymeric material is different than the second polymeric material. In accordance with certain embodiments of the invention, the first polymeric material, the second polymeric material, or both may comprise a compatibilizer comprising a copolymer having a comonomer content including (i) at least 10% by weight of the compatibilizer of a first monomer (e.g., ethylene monomer) corresponding to the first polyolefin and (ii) at least 10% by weight of the compatibilizer of a second monomer (e.g., polypropylene) corresponding to the second polyolefin. In accordance with certain embodiments of the invention, the compatibilizer provides a greater adhesion between the first and second components. Methods of forming a nonwoven fabric according to certain embodiments of the invention may further comprise a step of calendaring the at least one nonwoven layer to compact the multi-component fibers against one another forming a substantially smooth outer surface in the form a microporous film that permits gas to pass therethrough while also serving as a barrier to bacteriological contamination.

In another aspect, the present invention provides a package comprising a sealed or sealable container. The container may comprise an interior defined at least in part by a container-wall, in which at least a portion of the sealed or sealable container comprises a breathable material, such as a nonwoven fabric as disclosed herein. In accordance with certain embodiments of the invention, the breathable material is permeable to gas (e.g., sterilizing gas) such that a sterilizing gas, such as ethylene oxide, can pass into and out of the interior of the sealed or sealable container. In accordance with certain embodiments of the invention, the breathable material provides a barrier to liquids (e.g., impermeable to liquid) and bacteriological contamination.

In yet another aspect, the present invention provides a method of sterilizing a package comprising the following steps: (i) providing a package (e.g., in sealed form and having an article disposed within the sealed package); (ii) placing the package in an air chamber; (iii) evacuating the air out of the air chamber and the package; (iv) filling the air chamber and package with a sterilizing gas; (v) allowing the sterilizing gas to remain within the air chamber and package for a pre-determined period of time; and (vi) evacuating the sterilizing gas from the air chamber and the package.

In yet another aspect, the present invention provides a multi-component fiber comprising at least a first component comprising a first polymeric material including a first polyolefin and a second component comprising a second polymeric material including a second polyolefin, in which the first polymeric material is different than the second polymeric material. In accordance with certain embodiments of the invention, the multi-component fibers may comprise at least a first component comprising a first polymeric material including a first polyolefin (e.g., polyethylene) and a second component comprising a second polymeric material including a second polyolefin (e.g., polypropylene), in which the first polymeric material is different than the second polymeric material. In accordance with certain embodiments of the invention, the first polymeric material, the second polymeric material, or both may comprise a compatibilizer comprising a copolymer having a comonomer content including (i) at least 10% by weight of the compatibilizer of a first monomer (e.g., ethylene monomer) corresponding to the first polyolefin and (ii) at least 10% by weight of the compatibilizer of a second monomer (e.g., polypropylene) corresponding to the second polyolefin. In accordance with certain embodiments of the invention, the compatibilizer provides a greater adhesion between the first and second components.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 20A:
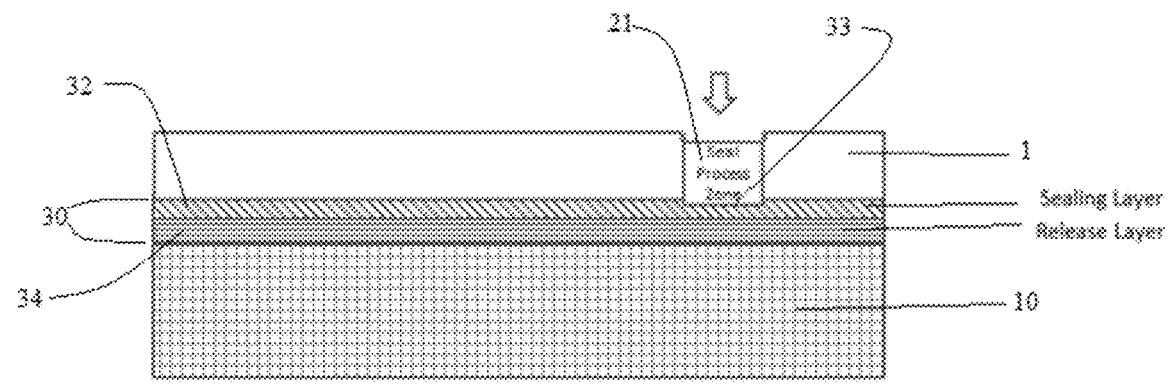
Figure 20B:
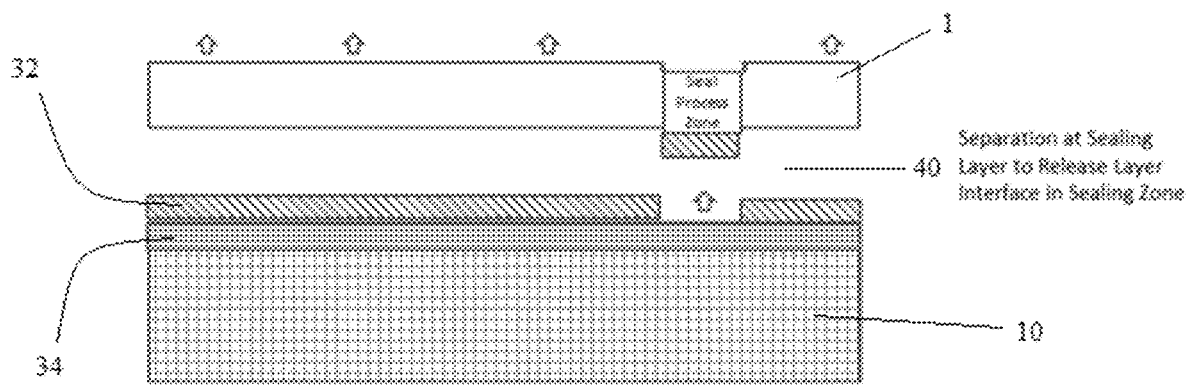

FIG. 20A illustrates a nonwoven fabric sealed to a structure (e.g., a packaging material) via separate sealing and release layers in accordance with certain embodiments of the invention; and FIG. 20B illustrates the separation of the seal illustrated in FIG. 20A, in which the separation of the seal has occurred at the sealing layer-to-release layer interface (e.g., a buried seal peel) in accordance with certain embodiments of the invention.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The presently-disclosed invention relates generally to multi-component fibers having improved inter-component adhesion via incorporation of a suitable compatibilizer and nonwoven fabrics including the same, in which the nonwoven fabrics are suitable for use a breathable barrier material in sterilized and/or sterilizable packages. In accordance with certain embodiments of the invention, the multi-component fibers include at least a first component and a second component being structurally and chemically distinct from each other (e.g., a polyethylene or copolymer thereof as a first component and a polypropylene or copolymer thereof as a second component). The first and second components, for example, may comprise different polymeric materials including one or more polyolefins. Although the first and second polymeric materials may be comprised mostly (e.g., more than 50% by weight) of olefinic content and the polarities of the first polymeric material and the second polymeric material may be the same or substantially the same, the first and second materials may essentially be incompatible in the absence of a suitable compatibilizer, such as those described herein. For instance, the first and second materials may be poorly miscible and have poor adhesion between the two separate materials in the absence of a suitable compatibilizer, such as those described herein. Typically blends of isotactic polypropylene (iPP) with polyethylene polymers, for example, are immiscible. In fact even the miscibility of iPP with ethylene/propylene copolymers is low unless the concentration of ethylene content is very low. In accordance with certain embodiments of the invention, however, the compatibility and adhesion strength between such materials may be increased by incorporation of a copolymer used to compatibilize the otherwise incompatible polyolefins and/or polyolefin blends. In this regard, the adhesion strength between a first component of a multicomponent fiber and a second component of the multi-component fiber may be increased.

In accordance with certain embodiments of the invention, the compatibilizer may comprise one or more olefinic copolymers, in which the compatibilizer may be incorporated into the polymeric blend used to form one or more distinct phases or components of a multi-component fiber. For example, the multi-component fiber may comprise a bicomponent fiber having a sheath/core configuration, an islands-in-the-sea configuration, a side-by-side configuration, a tri-lobal configuration, a pie-shaped configuration, or any other configuration of fiber structure where multiple components or phases exist. For example, a multi-component fiber may comprise a side-by-side configuration where one side of the fiber includes multiple components that have been compatibilized by the use of a compatibilizer as disclosed herein. In accordance, with certain embodiments of the invention, for example, one or more (e.g., all) of the components of a multi-component fiber may include a compatibilizer as disclosed herein. Such compatibilized multi-component fibers may in whole or in part form a nonwoven fabric. Beneficially, nonwoven fabrics in accordance with certain embodiments of the invention may be subjected to calendering (e.g., high pressure smooth calendering) to form a breathable barrier material that is permeable to gas (e.g., sterilizing gas) while providing barrier properties with respect to liquids and bacterial contamination. In accordance with certain embodiments of the invention, the nonwoven fabrics have improved resistance to tearing and puncture compared to materials like medical grade paper or structurally similar (or same) materials without the presence of a compatibilizer, such as disclosed herein. Multi-component fibers and nonwovens including the same, in accordance with certain embodiments of the invention, may comprise an improved bonding between the separate phases or components of the multi-component fibers (e.g., inter-component adhesion between a sheath component and a core component) as well as improved cleanliness of peel (e.g., substantially no debris from fiber pull-out or sheath pull-out due to separation from the core component). In accordance with certain embodiments of the invention, for instance, the improved inter-component adhesion (e.g., improved adhesion between a sheath component and a core component) enables enhanced durability of calendered materials including such multi-component fibers as evidenced, for example, by reduced production of loose fibers or fragments thereof, including at adhesive interfaces and upon remove of adhesive joints. The addition of an olefinic block copolymer or olefinic random copolymer compatibilizer to one or more components of multi-component fibers (e.g., the sheath and/or core components of a sheath/core bicomponent fiber) reduces the tendency of the components to separate due to mechanical stresses and strains produced, for example by a high pressure calendaring system while still allowing enough flow of the materials to reduce pore sizes of the nonwoven fabric and thus increase barrier properties. In accordance with certain embodiments of the invention, the multi-component fibers and nonwovens including the same may be incorporated into a variety of end-use applications including breathable packaging, breathable protective garments, etc.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes.

The term "staple fiber", as used herein, may comprise a cut fiber from a filament. In accordance with certain embodiments, any type of filament material may be used to form staple fibers. For example, staple fibers may be formed from polymeric fibers, and/or elastomeric fibers. Non-limiting examples of materials may comprise polyolefins (e.g., a polypropylene or polypropylene-containing copolymer), polyethylene terephthalate, and polyamides. The average length of staple fibers may comprise, by way of example only, from about 2 centimeter to about 15 centimeter.

The term "layer", as used herein, may comprise a generally recognizable combination of similar material types and/or functions existing in the X-Y plane.

The term "multi-component fibers", as used herein, may comprise fibers formed from at least two different polymeric materials (e.g., two or more) extruded from separate extruders but spun together to form one fiber. The term "bi-component fibers", as used herein, may comprise fibers formed from two different polymeric materials extruded from separate extruders but spun together to form one fiber. The polymeric materials or polymers are arranged in a substantially constant position in distinct zones across the cross-section of the multi-component fibers and extend continuously along the length of the multi-component fibers. The configuration of such a multi-component fibers may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

Figure 1:
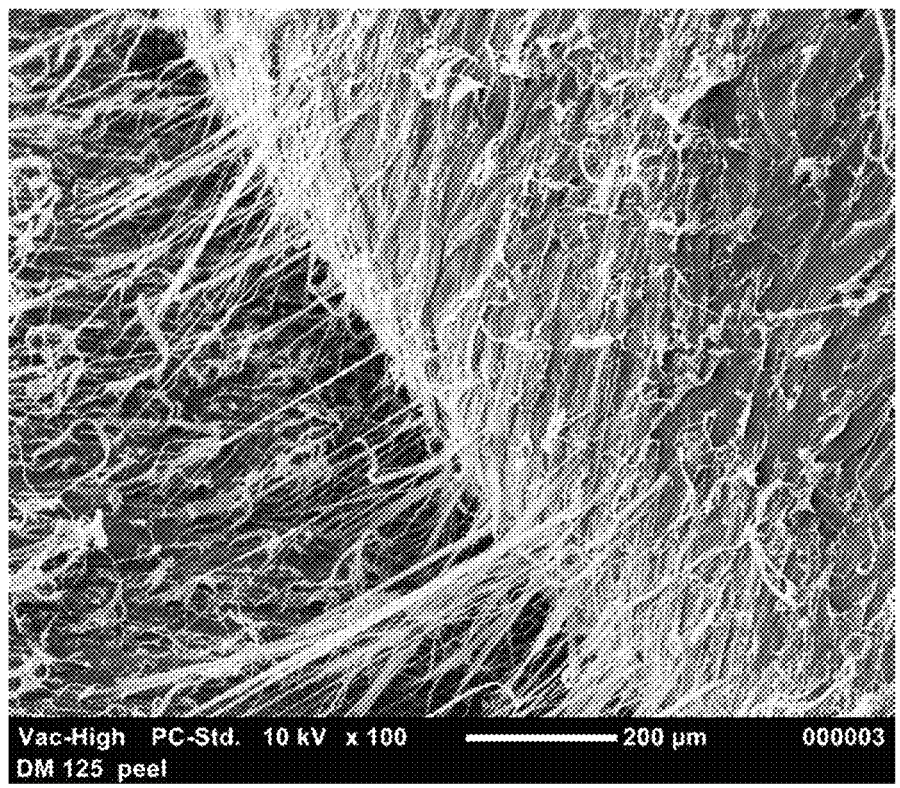
FIG. 1 shows a scanning electron microscope (SEM) image of undesirable fiber peel (e.g., fiber pull-out and separation of sheath components from core components)
Figure 2:
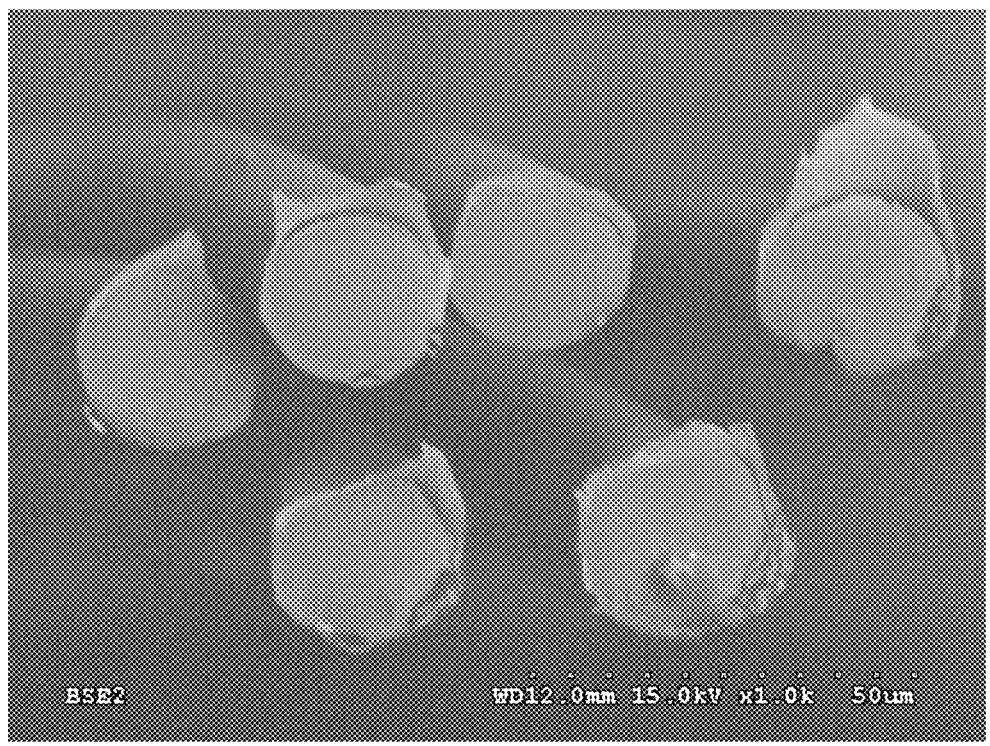
FIG. 2 shows a cross-sectional SEM image of bicomponent fibers having a polyethylene sheath and a polypropylene core, in which the sheath component has separated from the core component due to mechanical stresses and strains.
Figure 3:
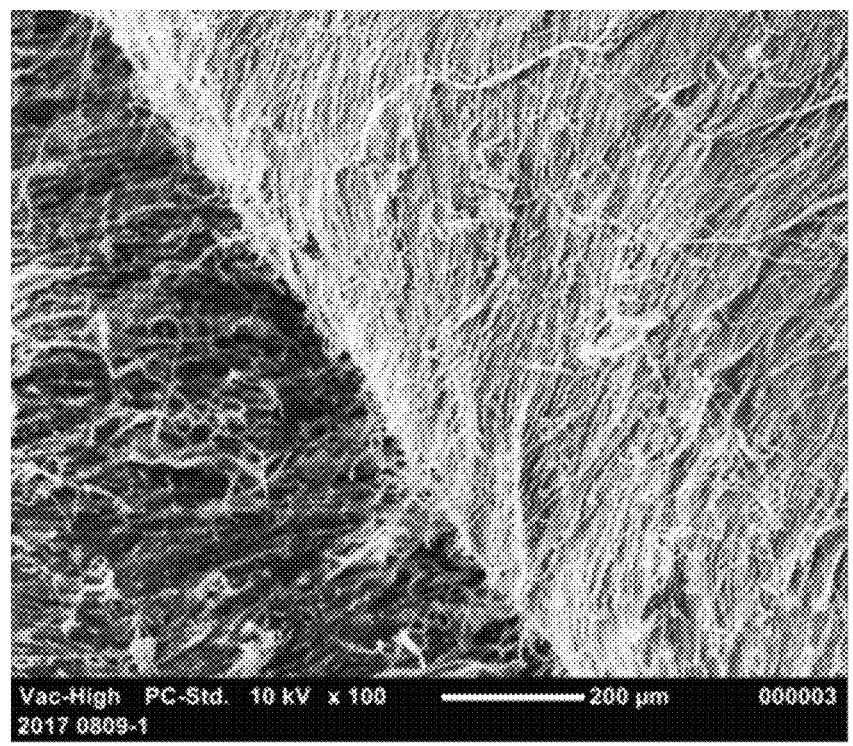
FIG. 3 shows a SEM image of a desirable clean peel (e.g., minimal to no fiber pull-out and/or separation of sheath components from core components) according to certain embodiments of the invention.
Figure 4:
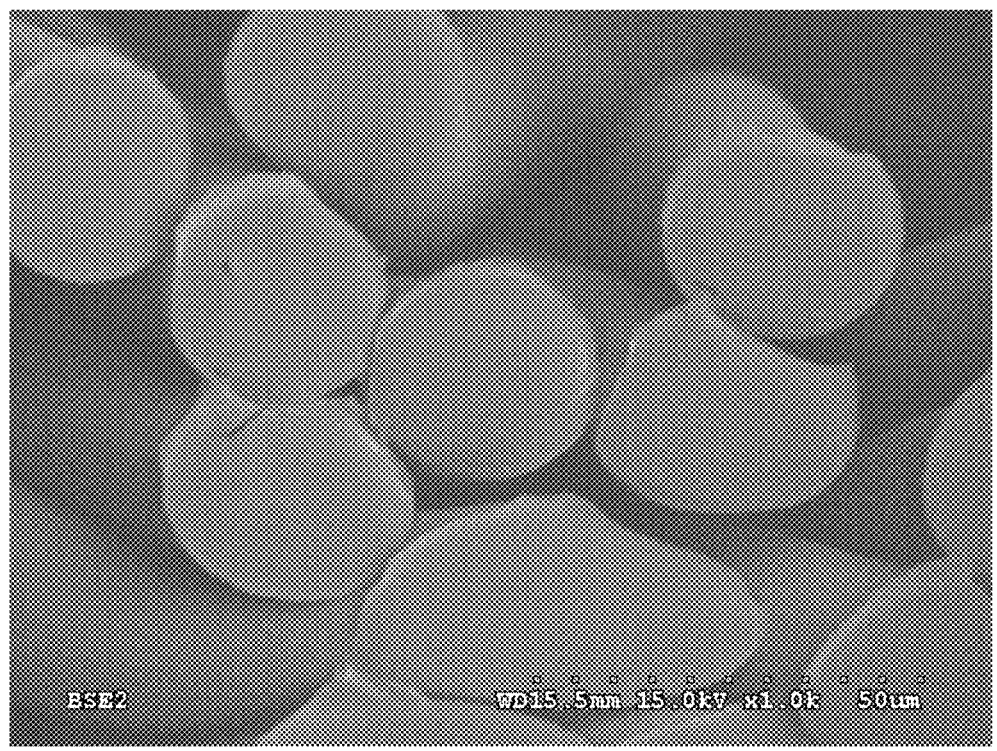
FIG. 4 shows a cross-sectional SEM image of bicomponent fibers having a polyethylene sheath and a polypropylene core, in which the sheath component includes a compatibilizer as disclosed herein and has not separated from the core component due to mechanical stresses and strains, in accordance with certain embodiments of the invention.

In one aspect, the invention provides provide a breathable material (e.g., breathable barrier material) in the form of a nonwoven fabric. In accordance with certain embodiments of the invention, for example, the nonwoven fabric may comprise at least a first nonwoven layer (e.g., one or more nonwoven layers) comprising multi-component fibers densely arranged and compacted against one another to form, for example, a substantially smooth outer surface on at least a first side of the nonwoven fabric. In accordance with certain embodiments of the invention, the densely arranged and compacted multi-component fibers may be described as defining a structure of a microporous film (e.g., at least on the outermost surface of the nonwoven fabric) that permits gas to pass therethrough while also providing a barrier to liquids and microbial penetration. In accordance with certain embodiments of the invention, the multi-component fibers may comprise at least a first component comprising a first polymeric material including a first polyolefin (e.g., polyethylene) and a second component comprising a second polymeric material including a second polyolefin (e.g., polypropylene), in which the first polymeric material is different than the second polymeric material. In accordance with certain embodiments of the invention, the first polymeric material, the second polymeric material, or both may comprise a compatibilizer comprising a copolymer having a comonomer content including (i) at least 10% by weight of the compatibilizer of a first monomer (e.g., ethylene monomer) corresponding to the first polyolefin and (ii) at least 10% by weight of the compatibilizer of a second monomer (e.g., polypropylene) corresponding to the second polyolefin. In accordance with certain embodiments of the invention, the compatibilizer provides a greater adhesion between the first and second components. FIG. 3, for instance, shows a SEM image of a desirable clean peel (e.g., minimal to no fiber pull-out and/or separation of sheath components from core components) according to certain embodiments of the invention. In this regard, the only difference between the material illustrated in FIG. 1 and FIG. 3 is the inclusion of a compatibilizer as disclosed herein into the sheath component of the bicomponent fibers (i.e., bicomponent fibers having a sheath component comprising a polyethylene and the core component comprising a polypropylene) according to certain embodiments of the invention. As shown in FIG. 3, the incorporation of a compatibilizer as disclosed herein greatly reduced the amount of undesirable debris due to various mechanisms of fiber pull-out upon peeling of a seal formed, at least in part, with a nonwoven fabric including such fibers. FIG. 4 shows a cross-sectional SEM image of bicomponent fibers having a polyethylene sheath and a polypropylene core, in which the sheath component includes a compatibilizer as disclosed herein and has not separated from the core component due to mechanical stresses and strains, in accordance with certain embodiments of the invention. In this regard, the only difference between the bicomponent fibers shown in FIG. 3 and FIG. 4 (as compared to the bicomponent fibers shown in FIG. 1 and FIG. 2) is the presence of a compatibilizer as disclosed herein in the sheath component of the bicomponent fibers.

Figure 5:
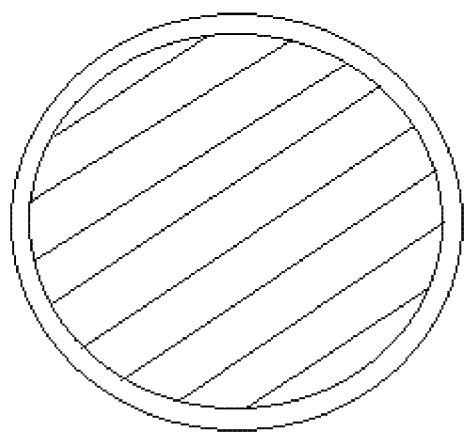
FIG. 5 illustrates a cross-section for a bicomponent fiber having a sheath/core configuration in which the sheath component surrounds the core component in accordance with certain embodiments of the invention.
Figure 6A:
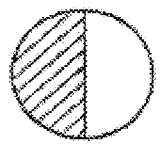
FIGS. 6A-6H illustrates examples of cross-sections for some multi-component fibers in accordance with certain embodiments of the invention.
Figure 6B:
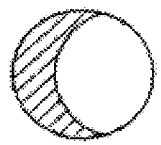
Figure 6C:
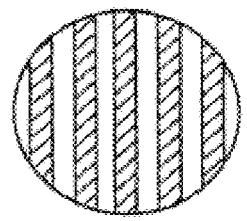
Figure 6D:
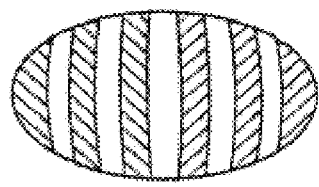
Figure 6E:
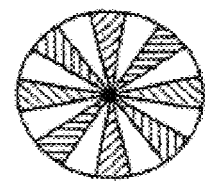
Figure 6F:
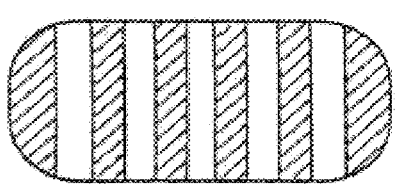
Figure 6G:
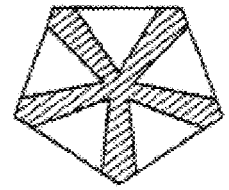
Figure 6H:
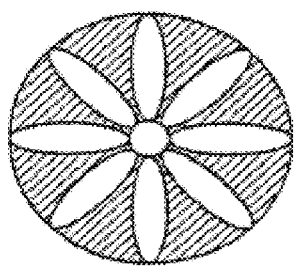

In accordance with certain embodiments of the present invention, the multi-component fibers may comprise one or more configurations, such as a sheath/core configuration, a side-by-side configuration, a pie configuration, an islands-in-the-sea configuration, a multi-lobed configuration, or any combinations thereof. In accordance with certain embodiments of the invention, the multi-component fibers comprise bicomponent fibers, such as bicomponent fibers having a sheath/core configuration. FIG. 5, for example, illustrates a cross-sectional view of a bicomponent fiber having a first component defining a sheath component that surrounds a second component defining a core component. As discussed above, the sheath component and core component may comprise different polymeric materials. In accordance with certain embodiments of the invention, the individual components of the multi-component fibers may comprise, as illustrated in FIGS. 6A-6H, a half-half configuration, crescent configuration, banded configuration, pie configuration, star configuration, petal configuration, etc. In accordance with certain embodiments of the invention, the segments may be formed continuously along the total length of the fibers (e.g., continuous fibers, discontinuous fibers, staple fibers, etc.). By way of example, the multi-component fibers may comprise a first polymeric material that defines the sheath component that has a first melting point and a second polymeric material that defines the core component and has a second melting point. In accordance with certain embodiments of the invention, the first melting point is lower than the second melting point. In this regard, nonwoven fabrics formed from such multi-component fibers may be consolidated (e.g., thermal bonding) at a temperature in which the sheath component softens and flows to reduce the porosity of the nonwoven fabric while the core component does not or does not substantially soften and/or flow to maintain the structural integrity of the consolidated nonwoven fabric.

In accordance with certain embodiments of the invention, the first polymeric material (e.g., forming a sheath component) may comprise a polyethylene or copolymer thereof. For instance, the first polymeric material may comprise from about 50% to about 100% by weight of ethylene monomer units. For instance, the first polymeric material may comprise at most about any of the following: 100, 95, 90, 85, 80, 75, 70, and 65% by weight of ethylene monomer units and/or at least about any of the following: 50, 55, 60, 70, and 75% by weight of ethylene monomer units. In accordance with certain embodiments of the invention, the second polymeric material (e.g., forming a core component) may comprise a polypropylene or copolymer thereof. In accordance with certain embodiments of the invention, the second polymeric material (e.g., forming a core component) may comprise from about 50% to about 100% by weight of propylene monomer units. For instance, the second polymeric material may comprise at most about any of the following: 100, 95, 90, 85, 80, 75, 70, and 65% by weight of propylene monomer units and/or at least about any of the following: 50, 55, 60, 70, and 75% by weight of propylene monomer units.

In accordance with certain embodiments of the invention, the first polymeric material may include the compatibilizer in an amount from about 0.1% to about 50% by weight of the first polymeric material, such as from about 1% to about 20% by weight, or from about 1% to about 15% by weight. For instance, the first polymeric material may include the compatibilizer in an amount at most about any of the following: 50, 45, 40, 35, 30, 25, 20, 15, 10, 7.5, and 5% by weight of the first polymeric material and/or at least about any of the following: 0.1, 0.5, 1, 2, 2.5, 3, 4, 5, and 6% by weight of the first polymeric material. Additionally or alternatively, the second polymeric material may include the compatibilizer in an amount from about 0.1% to about 50% by weight of the second polymeric material, such as from about 1% to about 20% by weight, or from about 1% to about 15% by weight. For instance, the second polymeric material may include the compatibilizer in an amount at most about any of the following: 50, 45, 40, 35, 30, 25, 20, 15, 10, 7.5, and 5% by weight of the second polymeric material and/or at least about any of the following: 0.1, 0.5, 1, 2, 2.5, 3, 4, 5, and 6% by weight of the second polymeric material.

In accordance with certain embodiments of the invention, the compatibilizer may comprise a copolymer having a comonomer content including (i) from at least 10% to about 90% by weight of the compatibilizer of the first monomer corresponding to the first polyolefin and (ii) at least 10% to about 90% by weight of the compatibilizer of the second monomer corresponding to the second polyolefin. For example, the compatibilizer may comprise a copolymer having a comonomer content including (i) from at least 25% to about 75% (e.g., at least 40% to about 60%, at least 40% to about 50%, etc.) by weight of the compatibilizer of the first monomer corresponding to the first polyolefin and (ii) at least 25% to about 75% (e.g., at least 40% to about 60%, at least 40% to about 50%, etc.) by weight of the compatibilizer of the second monomer corresponding to the second polyolefin. In accordance with certain embodiments of the invention, the first monomer may be ethylene and the second monomer may be propylene. In this regard, the compatibilizer may comprises an olefinic random copolymer or an olefinic block copolymer including both ethylene and propylene monomers to compatibilize, for example, a polyethylene sheath component or polyethylene-containing sheath component with a polypropylene core component or polypropylene-containing core component. An example of a random copolymer includes Vistamaxx™ (e.g., Vistamaxx™ 6202), a polypropylene-based elastomer that comprises a copolymer of propylene and ethylene. These propylene-based elastomers, for example, comprise isotactic polypropylene microcrystalline regions and random amorphous regions (e.g., ethylene). In this regard, these copolymers include a random ethylene distribution throughout the copolymer. Vistamaxx™ (e.g., Vistamaxx™ 6202) copolymers are commercially available from ExxonMobil. Vistamaxx™ 6202 has a density of 0,862 g/cc, a MI (190 C/2.16 kg) of 9.1, a MFR (230 C/2.16 kg load) of 20, and an ethylene content of 15% by weight.

Recent advances in single-site catalysts (e.g., metallocene catalysts) have allowed creation of variety of polymer structures that were difficult or impossible to create economically. In this regard, the compatibilizer may comprise a copolymer, as discussed above, formed from a single-site catalyst, such as a metallocene-catalyzed copolymer. For example, polypropylene-based polymers with significant amounts of ethylene content can be produced in a variety of configurations (e.g., well-defined blocks) to further enhance the copolymers' ability to bridge the interface of the first and second polymeric materials to improve compatibility and adhesion therebetween. An example includes an olefin diblock copolymer comprising an EP-iPP diblock polymer such as Intune™, which is a polypropylene-based block copolymer including ethylene monomers. In accordance with certain embodiments of the invention, the compatibilizing copolymer disclosed herein may be prepared, for example, by a process comprising contacting an addition polymerizable monomer or mixture of monomers under addition polymerization conditions with a composition comprising at least one addition polymerization catalyst, a co-catalyst and a chain shuttling agent ("CSA"), in which the process is characterized by formation of at least some of the growing polymer chains under differentiated process conditions in two or more reactors operating under steady state polymerization conditions or in two or more zones of a reactor operating under plug flow polymerization conditions. In accordance with certain embodiments of the invention, the compatibilizer may comprise an olefin block copolymer formed from a single-site catalyst or other catalyst systems. That is, the compatibilizer may not be produced from a single-site catalyst in accordance with certain embodiments of the invention. In accordance with certain embodiments of the invention, the compatibilizer is devoid of anhydride functionality, such as maleic anhydride functionality.

In accordance with certain embodiments of the invention, the copolymers formed from a single-site catalyst as discussed above may be differentiated from conventional, random copolymers, physical blends of polymers, and block copolymers prepared via sequential monomer addition. These copolymers may be differentiated from random copolymers by characteristics such as higher melting temperatures for a comparable amount of comonomer, block composite index, as described below; differentiated from a physical blend by characteristics such as block composite index, better tensile strength, improved fracture strength, finer morphology, improved optics, and greater impact strength at lower temperature; differentiated from block copolymers prepared by sequential monomer addition by molecular weight distribution, rheology, shear thinning, rheology ratio, and in that there is block polydispersity.

By way of further examples, the compatibilizer may comprise an EP-iPP diblock polymer that has an ethylene content from 43 to 48% by weight, or from 43.5 to 47% by weight, or from 44 to 47% by weight, based on the weight of the diblock copolymer. In an example embodiment, the EP-iPP diblock polymer may have a propylene content from 57 to 52% by weight, or from 56.5 to 53% by weight, or from 56 to 53% by weight, based on the weight of the EP-iPP diblock polymer.

Figure 19A:
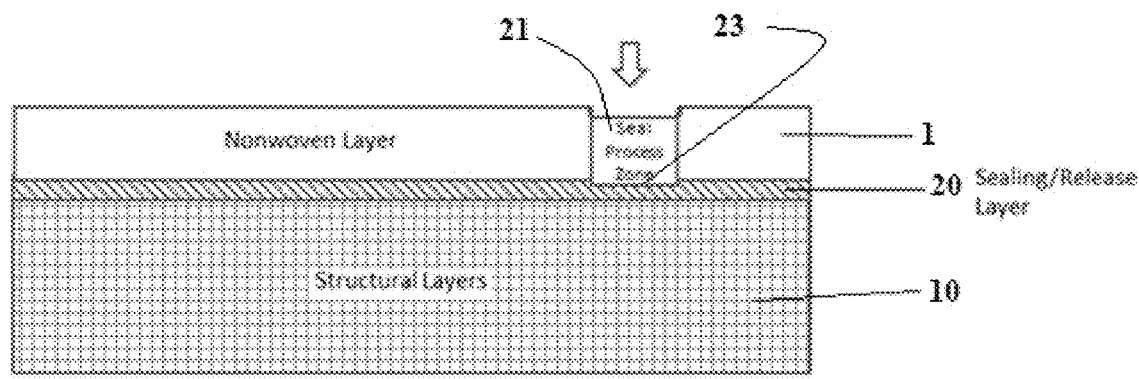
FIG. 19A illustrates a nonwoven fabric sealed to a structure (e.g., a packaging material) via a sealing/release layer format in accordance with certain embodiments of the invention.
Figure 19B:
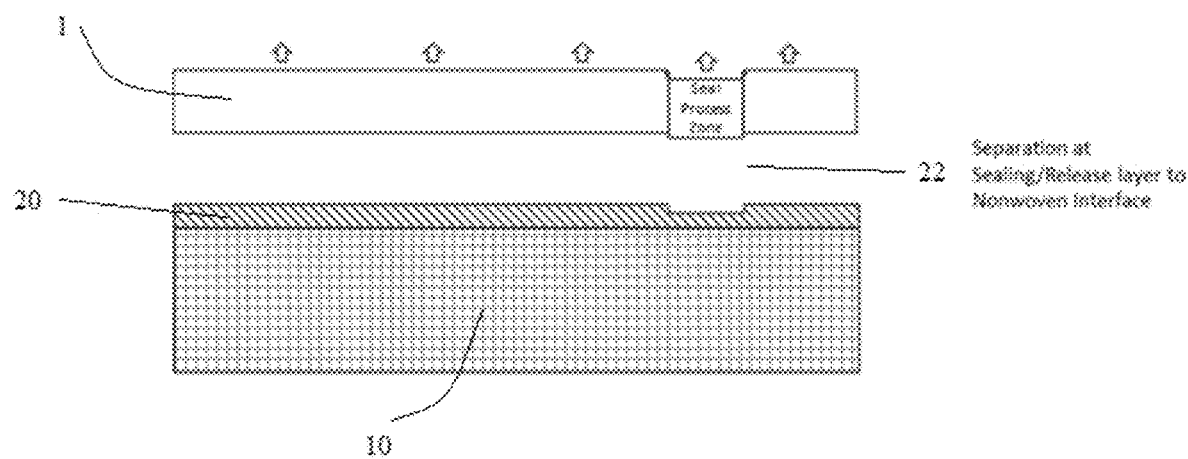
FIG. 19B illustrates the separation of the seal illustrated in FIG. 19A, in which the separation of the seal has occurred at the sealing/release layer-to-nonwoven fabric interface (e.g., an adhesive peel) in accordance with certain embodiments of the invention.

In accordance with certain embodiments of the invention, the incorporation of such olefinic copolymers into the melt forming one or more of the components of multi-component fibers as a compatibilizer provides an increase in the adhesion of, for example, polyethylene and polypropylene located in separate components (e.g., sheath and core components) that are in contact, such as the sheath and the core components of a bicomponent fiber. By incorporating such a compatibilizer into the core and/or the sheath of the bicomponent fibers that are part of a nonwoven fabric, for example, that has been smooth calendered, this compatibilizer increases the adhesion of the core component to the sheath component. As such, a nonwoven fabric formed from such multi-component fibers have an improved integrity, such as for a smooth calendered nonwoven fabric. The resulting nonwoven fabric, for example, has less probability of failure when peeled away when used in packaging applications due to a reduction and/or elimination of fiber pull-out (e.g., fiber-to-fiber interface) and sheath component pull-out (e.g., sheath-to-core interface) due to physical separation of the sheath component from the core component. Beneficially, the improved inter-component adhesion strength in accordance with certain embodiments of the invention facilitate the peeling of a seal or seam of a packaging material including such nonwoven fabrics in accordance with certain embodiments of the invention to occur at the sealing film (e.g. a weaker interface) instead of tearing portions (e.g., fibers or portions of fibers) of the nonwoven fabric loose. For example, if the strength of fiber-to-fiber and/or fiber core-to-sheath adhesion is greater than the adhesion of the sealing film to the calendered nonwoven, failure should occur at the weakest interface (i.e., at the sealing film leaving the nonwoven fabric intact as it is desired to have the peel separation to occur within the film or at the film:breathable nonwoven fabric interface, not within the nonwoven fabric). FIGS. 19A-19B (e.g., adhesive peel format) and FIG. 20A-20B (e.g., buried seal peel format) illustrate examples in which seal failure has occurred either at the sealing film-to-nonwoven fabric interface or with in the film structure itself (e.g., sealing layer-to-release layer interface).

In accordance with certain embodiments of the invention, the first polymeric material, the second polymeric material, or both may optionally further comprise a second compatibilizer comprising an anhydride functionality, such as maleic anhydride or maleic anhydride modified polymers. For instance, a nonwoven fabric in accordance with certain embodiments of the invention may comprise non-olefinic fibers intermingled with the multi-component fibers of the first nonwoven layer. In this regard, the second compatibilizer may stabilize or compatibilize the non-olefinic fibers (e.g., PET fibers compatibilized with polypropylene fibers of one or more other layers). Additionally or alternatively, the multi-component fibers may further comprise a third component that comprises a non-olefinic polymeric material, in which the third component is compatibilized by the second compatibilizer.

In accordance with certain embodiments of the invention, the multi-component fibers may comprise meltspun fibers, such as spunbond fibers or meltblown fibers. Additionally or alternatively, the multi-component fiber may comprise staple fibers. For instance, the first nonwoven layer may comprise a combination of staple fibers and meltspun fibers in accordance with certain embodiments of the invention. Irrespective of the type of fiber, the multi-component fibers may comprise a round cross-section, non-round cross-section, or both. A non-round cross-section may comprises a pie-shaped cross-section or a ribbon-shaped cross-section.

Nonwoven fabric in accordance with certain embodiments of the invention may further comprise, in addition to the first nonwoven layer, at least a second nonwoven layer. For example, the nonwoven fabric may comprise a plurality of nonwoven layers, in which each layer may be independently formed from a variety of forming techniques. The second nonwoven layer, for example, may comprise a meltblown layer or a sub-micron fiber containing layer. In such embodiments, for instance, the nonwoven fabric may comprise a multi-layer nonwoven fabric, such as a multi-layer nonwoven fabric having one of the following structures:

$$S1_a\text{-}M_b\text{-}S2_c$$

wherein;

'M' comprises a meltblown nonwoven;

'S1' comprises a first spunbond nonwoven;

'S2' comprises a second spunbond nonwoven;

'a' represents the number of layers and is independently selected from 1, 2, 3, 4, and 5;

'b' represents the number of layers is independently selected from 1, 2, 3, 4, and 5; and 'c' represents the number of layers is independently selected from 1, 2, 3, 4, and 5; wherein 'S1' includes the first nonwoven layer and 'S2' may optionally comprise a third nonwoven layer that is substantially similar (e.g., includes multi-component fibers as disclosed herein) to the first nonwoven layer.

In this regard, certain embodiments of the invention comprise a spunbond-meltblown (SM) or spunbond-meltblown-spunbond (SMS), as discussed above, in which the meltblown fibers are directly or indirectly sandwiched between outer layers of spunbond fibers. In accordance with certain embodiments of the invention, the SMS nonwoven fabric may be calendered (e.g., smooth surface calendered) as discussed above to densely pack the multi-component fibers of the spunbond layers and to form a microporous film structure on a least one outermost surface of the nonwoven fabric. In accordance with certain embodiments of the invention, the addition of meltblown fibers to the nonwoven fabric may increase barrier properties while maintaining the desirable clean peel and improved sheath core adhesion properties disclosed herein. The meltblown fibers may comprise one or more polyolefins or non-polyolefins (e.g., PET). In accordance with certain embodiments of the invention, the meltblown fibers may comprise a polyethylene or copolymer thereof, a polypropylene or copolymer thereof, a blend of polymers, a copolymer or a mixture of any of the foregoing. In accordance with certain embodiments of the invention, the meltblown fibers may comprise one or more compatibilizer, such as those disclosed herein.

In accordance with certain embodiments of the invention, one or more of the layers of the nonwoven fabric may comprise a carded layer. For example, one or more of the spunbond layers may be replaced with a carded web that may comprise multi-component fibers as disclosed herein.

Nonwoven fabrics, in accordance with certain embodiments of the invention, may further comprises an adhesive layer that is continuously or discontinuously coated onto at least one outermost surface of the nonwoven fabric to facilitate adherence of the nonwoven fabric to itself or other articles, such as flexible packaging materials or rigid formed trays. Alternatively, the nonwoven fabrics may be devoid of an adhesive disposed thereon.

In accordance with certain embodiments of the invention, the nonwoven fabric may comprise a smooth calendered nonwoven fabric. For example, the smooth calendered nonwoven fabric may be formed from smooth calendering at a nip pressure of about 1500 to about 4000 (e.g., 1500-3800, 1500-3500, etc.) pounds per linear inch and at an elevated temperature such that the first polymeric material having the first melting point being lower than the second melting point has softened and flowed to form a microporous film that permits gas to pass through the nonwoven fabric to allow, for example, sterilization while also serving as a barrier to bacteriological contamination and/or liquids.

Nonwoven fabrics (e.g., smooth calendered nonwoven fabrics), in accordance with certain embodiments of the invention, may comprise an air permeability (Gurley type, using ASTM D 726) of 10-50 sec/100 ml of air, such as about 15-40 sec/100 ml of air, or 25-35 sec/100 ml of air. Nonwoven fabrics, in accordance with certain embodiments of the invention may comprise improved Taber and/or Martindale abrasion resistance due to the improved inter-component adhesion disclosed herein (e.g., relative to an identical material but not including the compatibilizer as disclosed herein). Nonwoven fabrics (e.g., smooth calendered nonwoven fabrics), in accordance with certain embodiments of the invention, may comprise bacteriological barrier properties (as measured via ASTM 1608) that exceed a 1.5 log reduction value (LRV). In accordance with certain embodiments of the invention, the LRV may comprise from about a 0.8 to about a 5.5 (e.g., about a 1.5 to about a 5.2, about a 2.2 to about a 5.0, etc.). For instance, the LRV may comprise at most about any of the following: 6, 5.75, 5.5, 5.25, 5.2, 5, 4.75, 4.5, 4.25, 4, 3.75, 3.5, 3.25, 3, 2.75, 2.5, and 2.25 and/or at least about any of the following: 1.5, 1.6, 1.7, 1.8, 1.9, 2, 2.1, 2.2, 2.25, 2.5, 2.75, and 3.

Nonwoven fabrics (e.g., smooth calendered nonwoven fabrics), in accordance with certain embodiments of the invention, may comprise one or more additives, such as an antibacterial additive incorporated either topically or within the melt used to form the fibers of the nonwoven fabric. For example, an antimicrobial additive may be added into the melt forming the sheath component of a multi-component fiber. In accordance with certain embodiments of the invention, a variety of other additives may be added to the multi-component fibers or nonwoven fabric formed therefrom. For example, additives that may be incorporated into certain embodiments of the invention may include pigments, UV stabilizers, gamma sterilizers, antibacterials, antifungals, and inert fillers (e.g., calcium carbonate). In accordance with certain embodiments of the invention, the addition of one or more additives may be incorporated in neat form or as part of a pre-compounded particle or pellet to facilitate dispersion of the additive(s) across or throughout the fibers of the nonwoven fabric. In accordance with certain embodiments of the invention, the addition of the one or more additives may not impact the functionality of the multi-component fibers or nonwoven fabrics.

The nonwoven fabric, in accordance with certain embodiments of the invention, may comprises a basis weight from about 20-125 grams-per-square-meter (gsm), such as from about 30-100 gsm, 40-90 gsm, 50-80 gsm, 60-75 gsm, or from about 65-75 gsm. For instance, the fabric may comprise a basis weight of at most about any of the following: 125, 100, 90, 80, 75, 70, 65, 60, and 55 gsm and/or at least about any of the following: 20, 30, 40, 50, 55, 60, and 65 gsm.

In another aspect, the present invention provides a method of forming a nonwoven fabric, such as a nonwoven fabric disclosed herein, comprising forming or providing at least one nonwoven layer including a first nonwoven layer comprising multi-component fibers. The multi-component fibers comprise at least a first component comprising a first polymeric material including a first polyolefin and a second component comprising a second polymeric material including a second polyolefin, in which the first polymeric material is different than the second polymeric material. In accordance with certain embodiments of the invention, the first polymeric material, the second polymeric material, or both may comprise a compatibilizer comprising a copolymer having a comonomer content including (i) at least 10% by weight of the compatibilizer of a first monomer (e.g., ethylene monomer) corresponding to the first polyolefin and (ii) at least 10% by weight of the compatibilizer of a second monomer (e.g., polypropylene) corresponding to the second polyolefin. In accordance with certain embodiments of the invention, the compatibilizer provides a greater adhesion between the first and second components. Methods of forming a nonwoven fabric according to certain embodiments of the invention may further comprise a step of calendaring the at least one nonwoven layer to compact the multi-component fibers against one another forming a substantially smooth outer surface in the form a microporous film that permits gas to pass therethrough while also serving as a barrier to bacteriological contamination. In accordance with certain embodiments of the invention, the step of calendaring comprises smooth calendaring the at least one nonwoven layer at a nip pressure of about 1500 to about 4000 (e.g., 1500-3800, 1500-3500, etc.) pounds per linear inch and at an elevated temperature such that the first polymeric material having the first melting point being lower than the second melting point softens and flows to form the microporous film. In accordance with certain embodiments of the invention, process control during the calendaring operation may be enhanced by the use of an in-line porosimetry gauges (e.g., Avatron Systems Microperm Smart, or similar systems) to minimize process variation at the calendaring process. Such gauging may, for example, be used at a static location in the cross direction or be used in a traversing frame to sample various locations across much of the calenderer web. In this regard, the variability in permeability may be reduced.

In another aspect, the present invention provides a package comprising a sealed or sealable container. The container may comprise an interior defined at least in part by a container-wall, in which at least a portion of the sealed or sealable container comprises a breathable material, such as a nonwoven fabric as disclosed herein. In accordance with certain embodiments of the invention, the breathable material is permeable to gas (e.g., sterilizing gas) such that a sterilizing gas, such as ethylene oxide, can pass into and out of the interior of the sealed or sealable container. In accordance with certain embodiments of the invention, the breathable material provides a barrier to liquids (e.g., impermeable to liquid) and bacteriological contamination. In this regard at least a portion of the nonwoven fabric is directly or indirectly sealed to at least a portion of the container-wall.

In accordance with certain embodiments of the invention, the breathable material may comprise a nonwoven fabric (e.g., smooth calendered nonwoven fabrics) as disclosed herein. In accordance with certain embodiments of the invention, the breathable material may comprise an air permeability (Gurley type, using ASTM D 726) of 10-50 sec/100 ml of air, such as about 15-40 sec/100 ml of air, or 25-35 sec/100 ml of air. Breathable materials (e.g., nonwoven fabrics), in accordance with certain embodiments of the invention may comprise improved Taber and/or Martindale abrasion resistance due to the improved inter-component adhesion disclosed herein (e.g., relative to an identical material but not including the compatibilizer as disclosed herein). Breathable materials (e.g., smooth calendered nonwoven fabrics), in accordance with certain embodiments of the invention, may comprise bacteriological barrier properties (as measured via ASTM 1608) that exceed a 1.5 log reduction value (LRV). In accordance with certain embodiments of the invention, the LRV may comprise from about a 0.8 to about a 5.5 (e.g., about a 1.5 to about a 5.2, about a 2.2 to about a 5.0, etc.). For instance, the LRV may comprise at most about any of the following: 6, 5.75, 5.5, 5.25, 5.2, 5, 4.75, 4.5, 4.25, 4, 3.75, 3.5, 3.25, 3, 2.75, 2.5, and 2.25 and/or at least about any of the following: 1.5, 1.6, 1.7, 1.8, 1.9, 2, 2.1, 2.2, 2.25, 2.5, 2.75, and 3. In accordance with certain embodiments of the invention, the breathable material may comprise a smooth calendered nonwoven fabric as disclosed herein. Such breathable materials, for instance, may provide the combination of low permeability that facilitates higher LRV values while the smooth calendaring may provide better performance in peeling function described herein due, at least in part, to increased bonding. Such embodiments of the invention, for instance, may be particularly desirable in packaging applications.

In accordance with certain embodiments of the invention, the package may comprise an adhesive disposed on the container-wall and/or on a portion of the breathable material.

In accordance with certain embodiments of the invention, an adhesive may be applied only to the seal area or on only part of the surface of the nonwoven fabric to facilitate maintaining sufficient breathability to allow sterilization. This type of an adhesive seal, in accordance with certain embodiments of the invention, can also be accomplished through selection of an appropriate film as the opposing surface, in which the film includes a top sealing layer with reduced force required to peel. This could be in the format of a simple film with seal/release properties or a multilayer film application (e.g. form fill and seal moldable film). FIG. 19A, for example, illustrates a nonwoven fabric 1 sealed to a structure (e.g., a packaging material) 10 via a sealing/release layer format (e.g., single layered film) 20 in accordance with certain embodiments of the invention, in which the seal 21 formed between the nonwoven fabric 1 and the structure (e.g., packaging material) 10 via the sealing/releasing layer format (e.g., single layered film) 20 is illustrated by a slight depression formed in the nonwoven fabric formed, for example, by compression of the packaging materials together at the location of the seal 21 and/or added heat to the packaging materials at the location of the seal 21 to facilitate formation of the seal 21. FIG. 19B illustrates the separation 22 of the seal 21 illustrated in FIG. 19A, in which the separation 22 of the seal 21 has occurred at the sealing/release layer-to-nonwoven fabric interface (e.g., an adhesive peel) 23 in accordance with certain embodiments of the invention. Alternatively, the package may be devoid of an adhesive, such as in an area at or proximate to a sealing area of the package. In this regard, a seal or seam of the package may be devoid of an adhesive.

In accordance with certain embodiments of the invention, the package may further comprise a sealing film disposed on the container-wall and/or on a portion of the breathable material to provide a means for attaching and sealing the nonwoven fabric to the container-wall (e.g., flexible or rigid). For instance, the breathable material (e.g., the nonwoven fabric) may be sealed to the container wall via the sealing film. In accordance with certain embodiments of the invention, the package may comprise (i) a sealing film-to-container wall bond having a first bond strength and (ii) a sealing film-to-breathable material bond having a second bond strength, in which the first bond strength is greater than the second bond strength. In accordance with certain embodiments of the invention, a sealing film may comprise a topmost bonding layer comprised of a polyolefin or blend of polyolefins that have high adhesive attachment potential against the smooth calendered nonwoven fabric underlayed by a release layer with lower adhesive properties to the topmost bonding layer. For example, this structure may be referred to as a buried seal or frangible seal. In such an embodiment, in the peeling operation, the topmost bonding/adhesive layer will fracture along the edge of the seal, leaving a layer of the adhesive top lay bonded to the calendered nonwoven fabric in the seal area to ensure that loose fibers are not pulled out from the surface of the nonwoven fabric. FIG. 20A, for example, illustrates a buried seal format in which a nonwoven fabric 1 sealed to a structure (e.g., a packaging material) 10 via a multilayered film 30 including a sealing layer 32 and a separate release layer 34 in accordance with certain embodiments of the invention, in which the seal 21 formed between the nonwoven fabric 1 and the structure (e.g., a packaging material) 10 via the multilayered film 30 is illustrated by a slight depression formed in the nonwoven fabric 1 formed, for example, by compression of the packaging materials together at the location of the seal and/or added heat to the packaging materials at the location of the seal 21 to facilitate formation of the seal 21. FIG. 20B illustrates the separation 40 of the seal 21 illustrated in FIG. 20A, in which the separation 40 of the seal 21 has occurred at the sealing layer-to-release layer interface (e.g., a buried seal peel) 33 in accordance with certain embodiments of the invention.

Packages, in according to certain embodiments of the invention, may comprise a flexible package and the breathable material (e.g., nonwoven fabric) may define a window portion of the flexible package. Packages may also comprise rigid or semi-rigid packages and the breathable material (e.g., nonwoven fabric) may define a lid or flexible portion of the rigid or semi-rigid package that can be peeled off (e.g., separated from the package).

As disclosed herein and throughout, the breathable material (e.g., nonwoven fabric) provides a clean seal peel in which the amount of debris generated from the nonwoven fabric due to breaking the seal is significantly reduced or eliminated. In accordance with certain embodiments of the invention, the breathable material (e.g., nonwoven fabric) comprises multi-component fibers that comprise inter-fiber and inter-component bond strengths that exceed the sealing film-to-breathable material bond to provide a clean seal peel upon breaking of the sealing film-to-breathable material bond.

In accordance with certain embodiments of the invention, the package comprises an article, such as a medical device, disposed with the interior of the container. In accordance with certain embodiments of the invention, the medical device is sterile. In accordance with certain embodiments of the invention, an atmosphere within the interior of the container is substantially free of sterilizing gas.

In yet another aspect, the present invention provides a method of sterilizing a package, such as a package disclosed herein, comprising the following steps: (i) providing a package (e.g., in sealed form and having an article disposed within the sealed package); (ii) placing the package in an air chamber; (iii) evacuating the air out of the air chamber and the package; (iv) filling the air chamber and package with a sterilizing gas; (v) allowing the sterilizing gas to remain within the air chamber and package for a pre-determined period of time; and (vi) evacuating the sterilizing gas from the air chamber and the package. In accordance with certain embodiments of the invention, the sterilizing gas may comprise ethylene oxide, ethylene oxide and nitrogen, ethylene oxide and carbon dioxide, ethylene oxide with one or more chlorofluorocarbon diluents, ozone, hydrogen peroxide gas plasma, chlorine dioxide and mixtures thereof. In accordance with certain embodiments of the invention, there may be some introduction of moisture as well. For example, moisture may be introduced concomitantly with the sterilizing gas or sequentially with the sterilizing gas. Methods in accordance with certain embodiments of the invention may comprise repeating steps (iii) through (vii) in sequence for a plurality of sterilizing cycles (e.g., 2-10 cycles). In accordance with certain embodiments of the invention, the package may comprise a medical device sealed within an interior of the package. In accordance with certain embodiments of the invention, the sterilizing methods may conform to and/or satisfy ISO 11135:2014(en): Sterilization of health-care products—Ethylene oxide—Requirements for the development, validation and routine control of a sterilization process for medical devices.

In yet another aspect, the present invention provides a multi-component fiber as disclosed herein. For example, the multi-component fiber may comprise at least a first component comprising a first polymeric material including a first polyolefin and a second component comprising a second polymeric material including a second polyolefin, in which the first polymeric material is different than the second polymeric material. In accordance with certain embodiments of the invention, the multi-component fibers may comprise at least a first component comprising a first polymeric material including a first polyolefin (e.g., polyethylene) and a second component comprising a second polymeric material including a second polyolefin (e.g., polypropylene), in which the first polymeric material is different than the second polymeric material. In accordance with certain embodiments of the invention, the first polymeric material, the second polymeric material, or both may comprise a compatibilizer comprising a copolymer having a comonomer content including (i) at least 10% by weight of the compatibilizer of a first monomer (e.g., ethylene monomer) corresponding to the first polyolefin and (ii) at least 10% by weight of the compatibilizer of a second monomer (e.g., polypropylene) corresponding to the second polyolefin. In accordance with certain embodiments of the invention, the compatibilizer provides a greater adhesion between the first and second components.

EXAMPLES

The present disclosure is further illustrated by the following examples, which in no way should be construed as being limiting. That is, the specific features described in the following examples are merely illustrative and not limiting.

Test Methods

The Gurley air permeability tests were performed as per standard test method ASTM D726-58.

Figure 7:
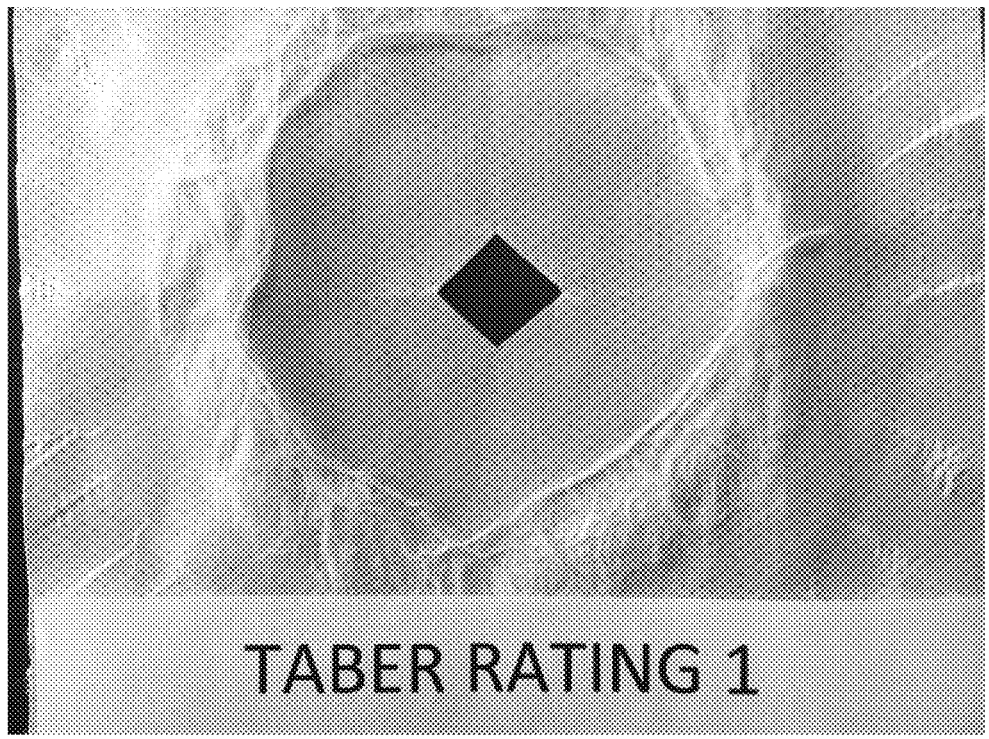
FIG. 7 is a visual representation of a Taber Rating having a value of 1 for the test results summarized in Table 1.
Figure 8:
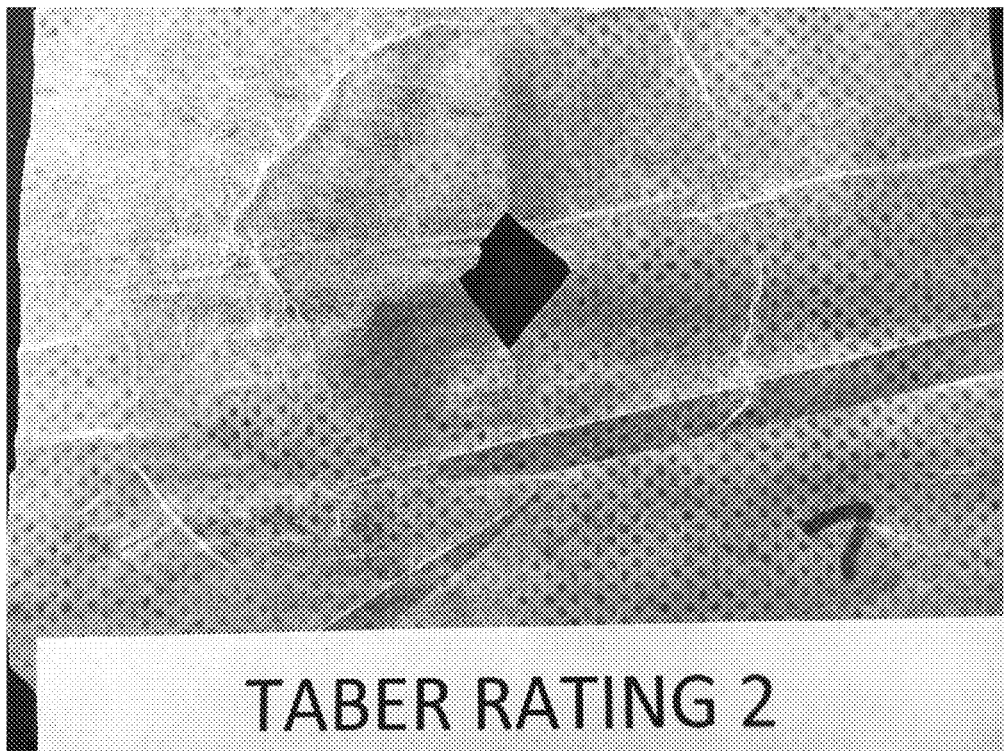
FIG. 8 is a visual representation of a Taber Rating having a value of 2 for the test results summarized in Table 1.
Figure 9:
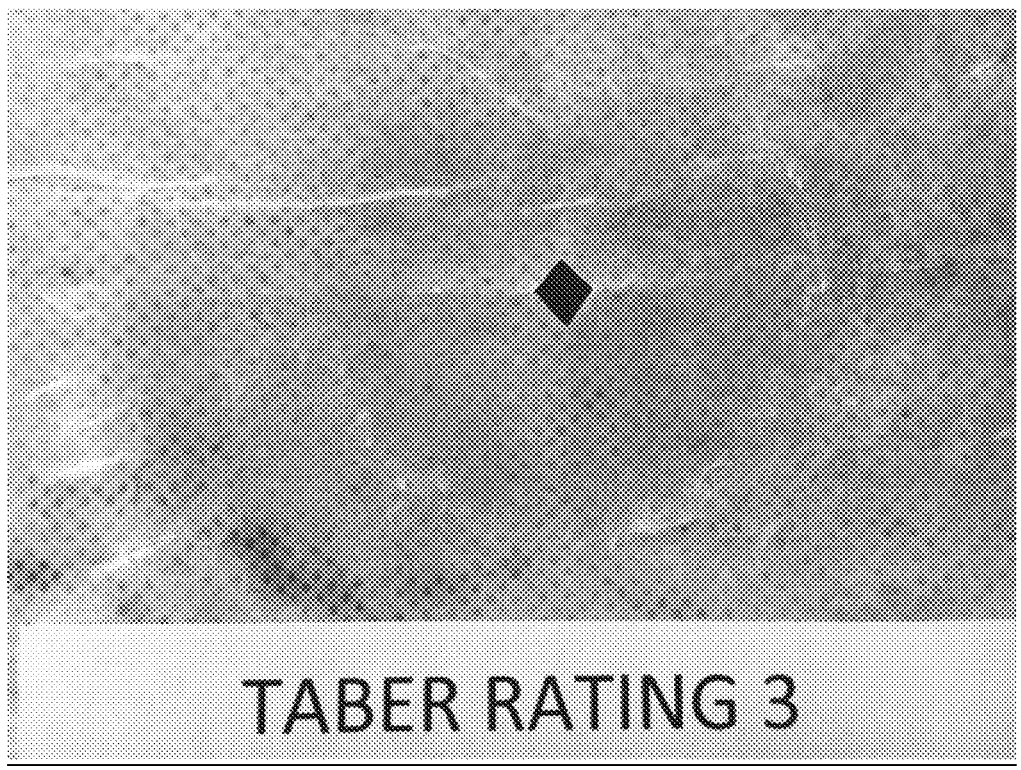
FIG. 9 is a visual representation of a Taber Rating having a value of 3 for the test results summarized in Table 1.
Figure 10:
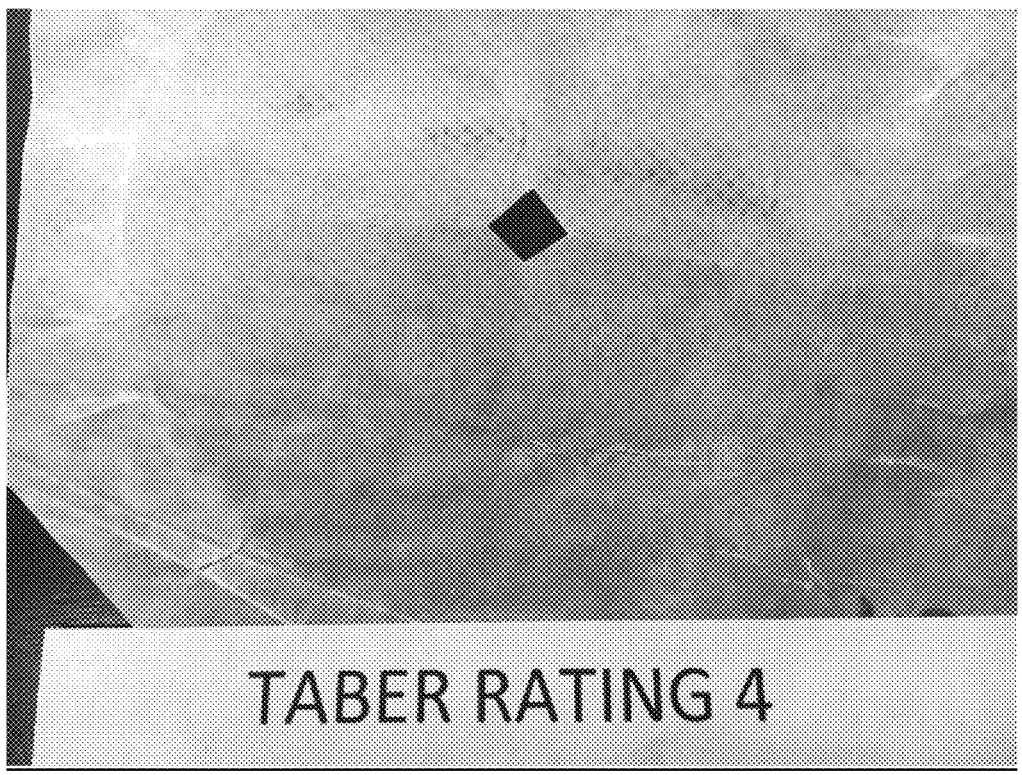
FIG. 10 is a visual representation of a Taber Rating having a value of 4 for the test results summarized in Table 1.
Figure 11:
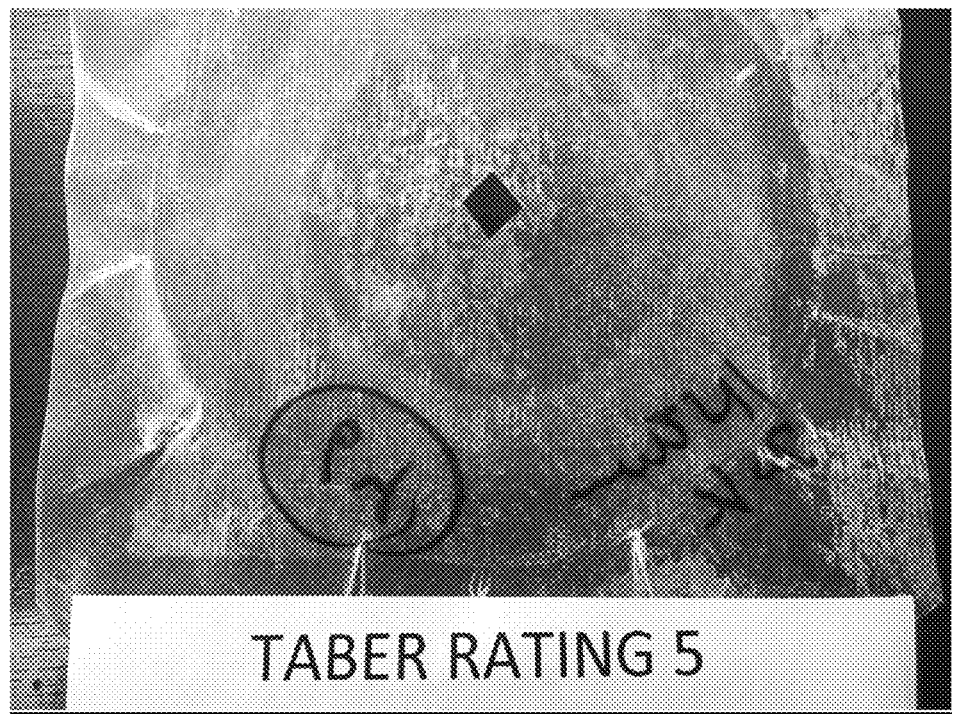
FIG. 11 is a visual representation of a Taber Rating having a value of 5 for the test results summarized in Table 1.

The Taber Abrasion tests were performed as per standard test method ASTM D4060-14 using Taber 5130 Abraser (North Tonanwanda, N.Y.) and abrading wheel type Calibrase CS-10 for 20 cycles. Twenty cycles was chosen as the number of cycles required to create significant abrasion damage to unmodified calendered nonwoven samples. The rating was done through comparison with pictures of abraded samples as shown in FIGS. 7-11. In particular, FIG. 7 is a visual representation of a Taber Rating having a value of 1 for the test results summarized in Table 1. FIG. 8 is a visual representation of a Taber Rating having a value of 2 for the test results summarized in Table 1. FIG. 9 is a visual representation of a Taber Rating having a value of 3 for the test results summarized in Table 1. FIG. 10 is a visual representation of a Taber Rating having a value of 4 for the test results summarized in Table 1. FIG. 11 is a visual representation of a Taber Rating having a value of 5 for the test results summarized in Table 1.

Example 1

This comparative example consisted of a spunbond fabric produced on a Reicofil 4 Spunbond line (Spicher Str. 46, 53844 Troisdorf, Germany) using three beams to produce layers of sheath/core bi-component filaments. The filaments were of the sheath/core configuration with the volume percent of the sheath being 25% and the volume percent of the core being 75%. The basis weight for this nonwoven was approximately 75 gsm. The sheath component of the filaments was composed from a polyethylene reported as having a density of 0.955 and known as Aspun 6850A from Dow Chemical Company, 2030 Dow Center Midland, Mich. 48674. The core component of the filaments was composed of a polypropylene reported as having a melt flow rate (MFR) of 34 and is known as CP360H 35 sold by Braskem, 1735 Market Street, 28th Floor, Philadelphia, Pa. This fabric was consolidated by point bonding with a calender using a U2888 pattern.

The spunbond nonwoven described above was then smooth calendered using three high pressure calender rolls heated to 135° C. (275° F.). The first two rolls were constructed such that a steel roll was opposed by a soft composite roll. The rolls were heated by hot oil. The surface of the soft rolls had Durometer 90 Shore D. The soft roll nip pressure was 437.8 Kilo N/m (2500 pli). The final roll set was a steel roll opposed by a steel roll and was held to a nip pressure of 1500 pli. This smooth calendering was performed at a line speed of 41.1 m/min (135 fpm)

Example 2

This example consisted of a spunbond fabric that was also produced on a Reicofil 4 line using three beams to produce bi-component filaments. The filaments were of the sheath/core configuration with the volume percent of sheath being 25% and the volume percent of the core being 75%. The basis weight for this nonwoven was approximately 75 gsm. For the filaments produced by the first and third beam, those forming the outside of the nonwoven, the sheath component for the filaments were formed from a blend consisting of 95% by weight of a polyethylene known as Aspun 6850A from Dow Chemical Company and 5% by weight of an ethylene/propylene block copolymer known as Intune D5545 and also sold by Dow Chemical Company. For the middle beam forming the center layer of the nonwoven the sheath component of the filaments were formed of a polyethylene know Aspun 6850A. The core component for the filaments for all three beams were formed of polypropylene CP360H sold by Braskem. This fabric was consolidated by point bonding with a calender using a U2888 pattern.

The spunbond nonwoven described above was then smooth calendered using three high pressure calender rolls heated to 135° C. (275° F.). The first two rolls were constructed such that a steel roll was opposed by a soft composite roll. The rolls were heated by hot oil. The surface of the soft rolls had Durometer 90 Shore D. The soft roll nip pressure was 437.8 Kilo N/m (2500 pli). The final roll set was steel roll opposed by a steel roll and was held to a nip pressure of 1500 pli. This smooth calendering was performed at a line speed of 38.1 m/min (125 fpm)

Example 3

This example consisted of a spunbond fabric that was also produced on a Reicofil 4 line using three beams to produce bi-component filaments. The filaments were of the sheath/core configuration with the volume percent of sheath being 25% and the volume percent of the core being 75%. The basis weight of the nonwoven was approximately 75 gsm. For the filaments produced by the first and third beam, those forming the outside of the nonwoven, the sheath components for the filaments were composed from a blend consisting of 95% by weight of a polyethylene known as Aspun 6850A from Dow Chemical Company and 5% by weight of an ethylene/propylene block copolymer known as Intune D5545 and also sold by Dow Chemical Company. For the first and third beam, the core component of the filaments were formed from a blend consisting of 90% by weight of polypropylene known as CP360H from Braskem and 10% by weight of an olefinic elastomer known as Vistamaxx 6202 sold by ExxonMobil, which is composed of isotactic propylene repeat units with random ethylene distribution and is reported as having a 15% by weight of an ethylene content. For the middle beam forming the center layer of the nonwoven, the sheath component of the filaments were formed from a polyethylene known as Aspun 6850A while the core component for the filaments were made of polypropylene P360H sold by Braskem. This fabric was consolidated by point bonding with a calender using a U2888 pattern.

The spunbond nonwoven described above was then smooth calendered using three high pressure calender rolls heated to 135° C. (275° F.). The first two rolls were constructed such that a steel roll was opposed by a soft composite roll. The rolls were heated by hot oil. The surface of the soft rolls had Durometer 90 Shore D. The soft roll nip pressure was 437.8 Kilo N/m (2500 pli). The final roll set was steel roll opposed by a steel roll and was held to a nip pressure of 1500 pli. This smooth calendering was performed at a line speed of 33.5 m/min (110 fpm)

Example 4

This example consisted of a spunbond fabric that was also produced on a Reicofil 4 line using three beams to produce bi-component filaments. The filaments were of the sheath/core configuration with the volume percent of sheath being 25% and the volume percent of the core being 75%. The basis weight of this nonwoven was approximately 75 gsm. For the filaments produced by the first and third beam, those forming the outside of the nonwoven, the sheath component for the filaments was formed from a polyethylene known as Aspun 6850A from Dow Chemical Company. For the first and third beams, the core component of the filaments were formed from a blend consisting of 90% by weight of a polypropylene known as CP360H from Braskem and 10% by weight of a olefinic elastomer known as Vistamaxx 6202 sold by ExxonMobil and described above. For the middle beam forming the center layer of the nonwoven, the sheath component of the filaments were formed of a polyethylene know Aspun 6850A while the core component for the filaments were made of polypropylene P360H sold by Braskem. This fabric was consolidated by point bonding with a calender using a U2888 pattern.

The spunbond nonwoven described above was then smooth calendered using three high pressure calender rolls heated to 135° C. (275° F.). The first two rolls were constructed such that a steel roll was opposed by a soft composite roll. The rolls were heated by hot oil. The surface of the soft rolls had Durometer 90 Shore D. The soft roll nip pressure was 437.8 Kilo N/m (2500 pli). The final roll set was steel roll opposed by a steel roll and was held to a nip pressure of 1500 pli. This smooth calendering was performed at a line speed of 32 m/min (105 fpm)

Sealing and Packaging Trials

Trial #1

The samples described in the examples above were sealed against a sealing film to create packages for medical applications. This was done using a Multivac Packaging machine Model number R-145 (MULTIVAC, Inc. 11021 N. Pomona Avenue, Kansas City, Mo. 64153 USA) and a mold also from Multivac and identified as Multivac 2T2R packaging array. It has a nominal cavity size of 175.5 mm×117 mm and draw depth from 25 to 100 mm. The corners of the mold had a 20 mm radius.

The sealing film was produced by Berry Global (101 Oakley St, Evansville, Ind. 47710) (Film part number was X7-19332-723.19). The film was composed of 7 layers with the sealing layer made from a blend of LDPE and poly-butene at an approximate ratio of 5:4 and also included pigment and a talc based anti-blocking compound. The other layers consisted of the following layers: tie layer, nylon layer, tie layer, nylon layer, and tie layer, with the outermost layer (i.e., layer being against the package) being primarily a blend of LDPE and LLDPE with addition of an anti-blocking compound. This film was selected because it produces strong bonds with the package and moderate bond strength with the breathable membrane (i.e., the nonwoven fabrics formed in the examples); therefore, allowing a package with good seal integrity while at the same time allowing the breathable membrane (i.e., the nonwoven fabrics formed in the examples) to be peeled away from the package with minimal deformation.

Seal peel performance was evaluated for all 4 types of calendered nonwovens against the sealing film described above.

There were two effects observed when determining conditions to achieve a clean seal peel for these materials: (1) the effect of cleaner seal when the sealing temperature was 145° C. or above for this type of material; and (2) a cleaner seal peel when compatibilizers as disclosed herein were used.

The smooth calendered fabric achieve improved sealing performance and clean seal peel appearance at temperatures of 145° C. and above using the multivac conditions described below. This result is in contrast to flashspun polyethylene materials used in similar packaging applications that are often sealed using a lower temperature. A secondary effect of this higher sealing temperature range realized by certain embodiments of the invention is that the seal becomes transparent, verifying that a continuous seal has been produced.

The improved seal appearance with the copolymer additive (e.g., compatibilizer) further improves the appearance of the seal peel area. The comparative effect due to the compatibilizer addition is illustrated in Table 1.

Trial #2

Medical tubing sets where packaged using the Multivac machine described above using the following conditions. The sealing conditions were: 92° C. for the cavity draw step; 150° C. for the seal formation step; a seal dwell time of 1.5 seconds; a sealing pressure of 3 bar at a 150° C. set point with a 2 second bonding time. These conditions were selected to produce more than 1 PLI as per ASTM F88—Packaging Seal Strength Test while minimizing filament or sheath pull out when the seam was peeled. The peel appearance test results as per the visual rating system described above for the packages made with the sample 1 to 4 are reported in Table 1.

Of note, these temperatures are higher than those used for Tyvek (composed of polyethylene alone) that has much lower temperature resistance. The bicomponent fiber structure used in the examples allows the calendered nonwoven construction described here to be sealed at higher temperatures than materials composed of polyethylene alone. For example, the polypropylene cores resist deformation and thinning at the seal area at temperatures above the melting point of polyethylene.

TABLE 1

| | Test Sample | | |
|---|---|---|---|
| | Gurley air permeability | Taber abrasion Method | Peel Rating (1) |
| | ASTM D726-58 | ASTM D4060-14 (20 cycles) Units | ASTM F88 |
| | Seconds | Rating (2) | Rating (3) |
| Sample 1 | 24 | 2 | 2.5 |
| Sample 2 | 31 | 3 | 4.5 |
| Sample 3 | 13 | 4.5 | 4.75 |
| Sample 4 | 18 | 3 | 4.75 |

(1) When sealed with film X7-19332-723.19 as per packaging trial #2;
(2) A higher value indicates better resistance to abrasion;
(3) A higher value indicates a higher peel rating and less fibrous appearance.

The results from Table 1 show that the samples formed in the examples in accordance with certain embodiments of the invention and the comparative example exhibited the desired Gurley air permeability being above 10 seconds (i.e., time for 100 cubic centimeters of air to pass though the sample via a 28.6 mm diameter orifice (procedure used was ISO 5636-5) and preferably above 20 second as values above these are typically associated with good performance as microbial barrier as tested by ASTM F1608. However, it is desirable not to exceed 60 seconds as values about this level are considered to indicate that the air permeability has been reduced to a point where it likely interferes with the rapid cycling of the sterilizing gas in and out of the package as expected during the sterilization process.

The results from the four samples have also illustrated that the presence of the Intune™ in the sheath or/and the presence of Vistamaxx™ in the core did improve the abrasion resistance as compared to the baseline sample containing neither (i.e., example 1). The best results were realized when the sheath contained the Intune™ and the core the Vistamaxx™, which suggests the best fiber-to-fiber as well as the best sheath/core adhesion.

An interesting observation was the low Gurley results obtained with sample 3 where the sheath contained Intune™ and the core contained Vistamaxx™. It is believed that this combination affected the fluidity of the polymers, which hindered their ability to flow as well as for Sample 2 during the sealing process; therefore, producing higher permeability as shown by the lower Gurley value. In this regard, it is possible that the improved bonding of the sheath component to the core component has made these fibers stiffer and thus require more force to deform and compress into a tighter structure.

Figure 12:
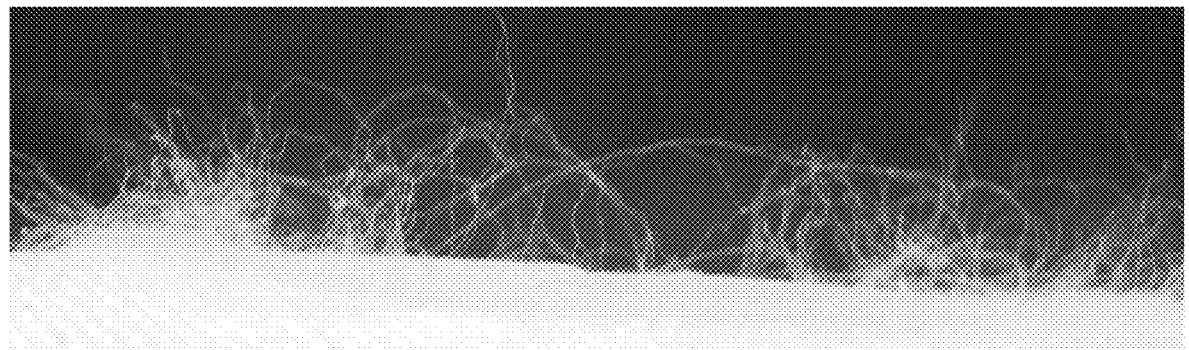
FIG. 12 illustrates the Taber Abrasion results for the pin bonded nonwoven fabric from example 1 (i.e., the control sample that was devoid of a compatibilizer) prior to being smooth calendered.
Figure 13:
FIG. 13 illustrates the Taber Abrasion results for the pin bonded nonwoven fabric from example 2 (i.e., compatibilizer incorporated into the sheath component of the multi-component fibers)
Figure 14:
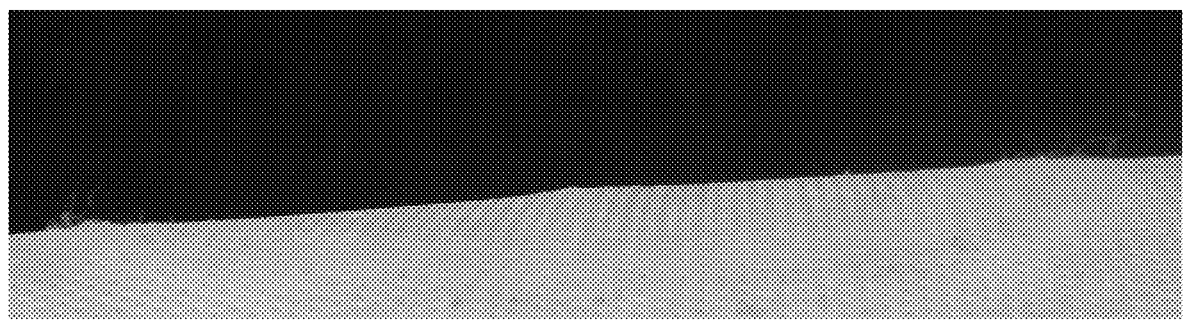
FIG. 14 illustrates the Taber Abrasion results for the pin bonded nonwoven fabric from example 3 (i.e., compatibilizer incorporated into the sheath component and the core component of the multi-component fibers)

In addition to the foregoing, the inclusion of a compatibilizer in one or more components of the multi-component fibers provided improved abrasion resistance to such multi-component fibers (e.g., primarily olefinic fibers and nonwovens made therefrom) prior to smooth calendaring. FIG. 12, for example, illustrates the Taber Abrasion results for the pin bonded nonwoven fabric from example 1 (i.e., the control sample that was devoid of a compatibilizer) prior to being smooth calendered. The nonwoven fabric was subjected to 20 cycles with a CS10 wheel, in which the abrading wheel was resurfaced before each and every test. FIG. 12 illustrates a substantial amount of lint on the surface of the control sample. FIG. 13 illustrates the Taber Abrasion results for the pin bonded nonwoven fabric from example 2 (i.e., compatibilizer incorporated into the sheath component of the multi-component fibers) under the same testing conditions noted above. FIG. 13 illustrates the drastic improvement in resistance to abrasion as evident by the significant reduction in the presence of lint on the surface of the nonwoven fabric. FIG. 14 illustrates the Taber Abrasion results for the pin bonded nonwoven fabric from example 3 (i.e., compatibilizer incorporated into the sheath component and the core component of the multi-component fibers) under the same testing conditions noted above. FIG. 14 illustrates the drastic improvement in resistance to abrasion as evident by the significant reduction in the presence of lint on the surface of the nonwoven fabric. The results are summarized in Table 2 below. In accordance with certain embodiments of the invention, for example, the nonwoven fabric has an initial resistance to abrasion value prior to being subjected to smooth calendaring that is greater than a comparative resistance to abrasion value of a nearly identical nonwoven fabric prior to being subjected to smooth calendaring, with the only exception being that the nearly identical nonwoven fabric does not include the compatibilizer as disclosed herein. In this regard, multi-component fibers and nonwovens formed thereof, in accordance with certain embodiments of the invention, may be particularly suited for applications that require abrasion resistance even when smooth calendaring is not performed (e.g., hygiene-related applications).

TABLE 2

| Test Sample Method Units | Taber abrasion ASTM D4060-14 (20 cycles) Rating (2) |
|---|---|
| Sample 1 | 2 |
| Sample 2 | 3 |
| Sample 3 | 4 |

(2) A higher value indicates better resistance to abrasion and the numerical values are based on the visual scale provided in FIGS. 7-11.

The four samples have also exceed the minimum average peel strength of 1 PLI selected as the minimum value needed to have a seam that maintain its integrity while the package is being handled. It is clear by looking at the results for sample 2 to 4 that the presence of a compatibilizer in the core and/or the sheath did improve the peel visual rating. A comparison of the results for sample 4 vs sample 1, in which the difference between the samples is simply the presence of Vistamaxx in the core of the filaments produced by beam 1 and 3, illustrates this point. While wishing not to be bound by the following theory, it is believed that the sheath/core adhesion is an important contributor to the clean peel rating (e.g., the stronger adhesion between the sheath component and the core component prevents the sheath component from pulling apart/separating from the core component to form undesirable debris).

Figure 15:
FIG. 15 shows the peel test results for a control sample with no compatibilizer.
Figure 16:
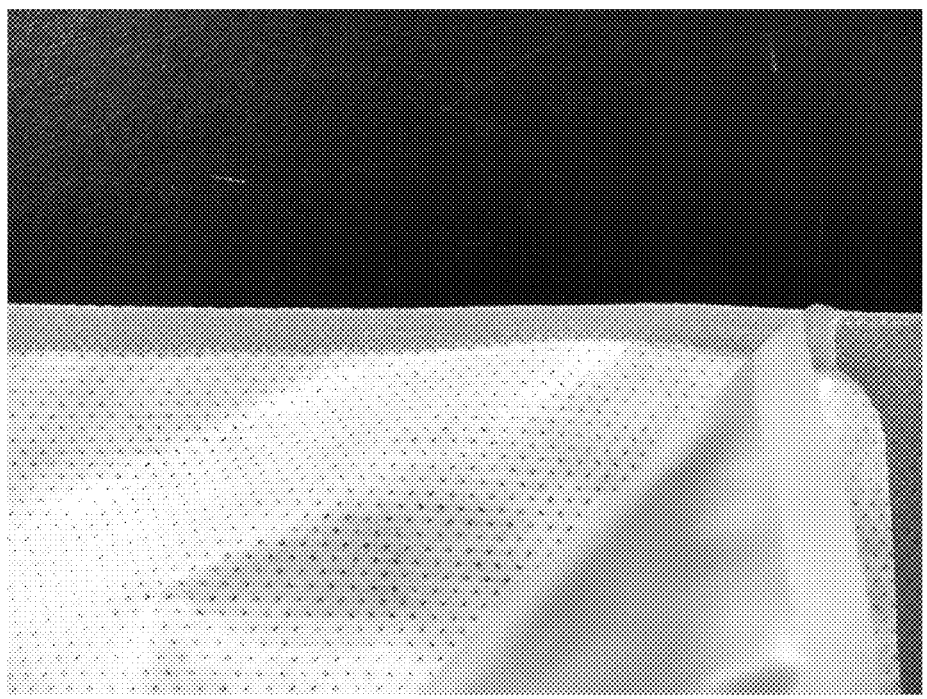
FIG. 16 shows the peel test results for an example in which a compatibilizer was incorporated into the sheath component of the bicomponent fibers in accordance with certain embodiments of the invention.
Figure 17:
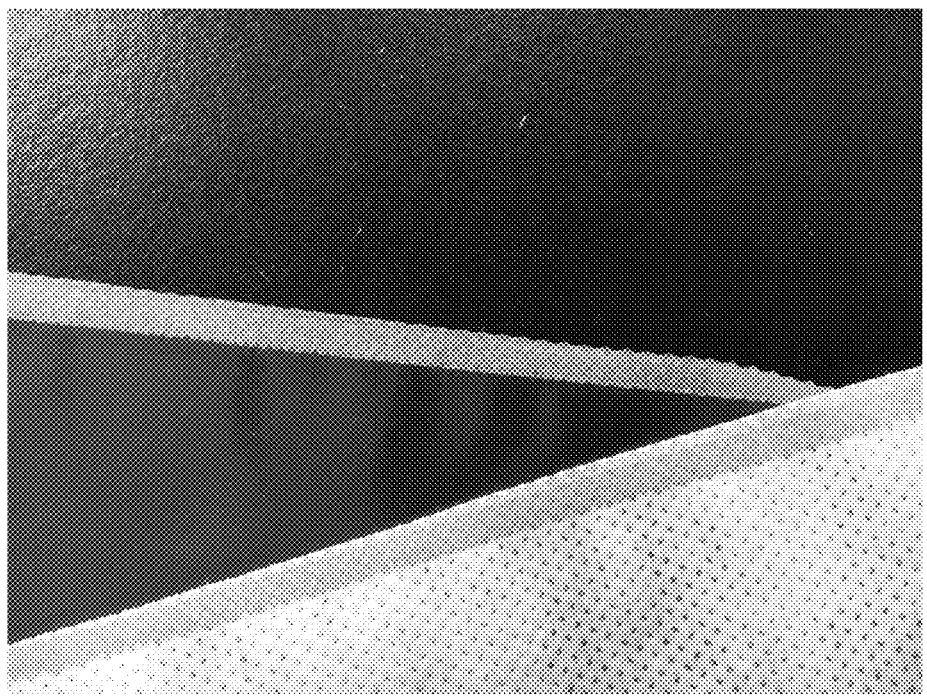
FIG. 17 shows the peel test results for an example in which a compatibilizer was incorporated into both the sheath component and the core component of the bicomponent fibers in accordance with certain embodiments of the invention.
Figure 18:
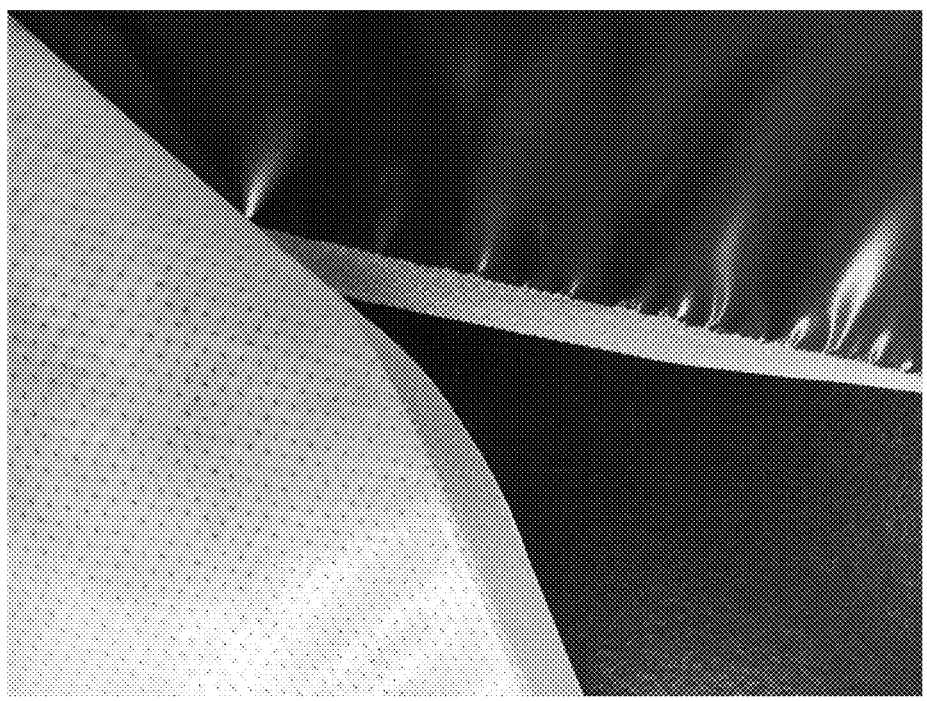
FIG. 18 shows the shows the peel test results for an example in which a compatibilizer was incorporated into the core component of the bicomponent fibers in accordance with certain embodiments of the invention.

Finally, FIGS. 15-18 illustrate the benefit of introducing the Intune™ D5545 (ethylene/propylene block copolymer) or the Vistamaxx copolymer. FIGS. 15-18, for instance, clearly show that a cleaner peel is achieved when the sheath of the filaments on the outer layer contained Intune™ and/or the core of the filaments contained Vistamaxx. FIG. 15 shows the peel test results for a control sample (i.e., example 1) with no compatibilizer. FIG. 15 shows a significant amount of debris (e.g., pulled fibers and/or fiber components) at the location of the peeled seal location. FIG. 16 shows the peel test results for example 2 in which a compatibilizer was incorporated into the sheath component of the bicomponent fibers in accordance with certain embodiments of the invention. As shown in FIG. 16, no fibrous debris was produced upon peeling the seal to provide a clean peel. FIG. 17 shows the peel test results for example 3 in which a compatibilizer was incorporated into both the sheath component and the core component of the bicomponent fibers in accordance with certain embodiments of the invention. As shown in FIG. 17, no fibrous debris was produced upon peeling the seal to provide a clean peel. FIG. 18 shows the shows the peel test results for example 4 in which a compatibilizer was incorporated into the core component of the bicomponent fibers in accordance with certain embodiments of the invention. As shown in FIG. 18, no fibrous debris was produced upon peeling the seal to provide a clean peel. In this regard, the presence of a compatibilizer (i.e., copolymer) selected for its elements compatible with polyethylene and polypropylene can improve the adhesion of the sheath component to the core component where one component predominantly contain polypropylene and the other component predominantly contains polyethylene. This approach, in accordance with certain embodiments of the invention, allow for peeling of the breathable membrane (e.g., nonwoven fabric disclosed herein) while distorting and/or breaking significantly less of those filaments. Although specific copolymers were used in these examples, these specific copolymers are merely illustrative and non-limiting.

Packages were produced as described above using material made per example 1, example 2, and example 3. These packages were then sterilized using a standard ethylene oxide cycle at Steris Applied Sterilization Technologies located at 380 90th Ave NW, Minneapolis, Minn. 55433. The cycle used was Cycle/Specification #STE-777 Rev D.

The sterilized packages were evaluated for package integrity, gross leak tests, and seal strength following the ISO-11607 medical packaging test protocol per the following specifications at DDL Test labs at 10200 Valley View Rd, Eden Prairie, Minn. 55344. Tested packages using the compatibilizer copolymers passed visual inspection ASTM F 1886, gross leak test (ASTM F2096), and seal strength (ASTM F88). Target seal average seal strength in this case was above 1.0 lbf/in. Test results are shown in Table 3.

TABLE 3

|  | Sample 2 | Sample 3 |
| --- | --- | --- |
| % Passing Visual Inspection | 100% | 100% |
| % Passing Gross Leak (Bubble) Test | 100% | 100% |
| Peel Strength Position A (lbf/in)* | 1.589 | 1.774 |
| Peel Strength Position B (lbf/in)* | 1.168 | 1.245 |
| Peel Strength Position C (lbf/in)* | 1.412 | 1.470 |
| Peel Strength Position D (lbf/in)* | 1.060 | 1.053 |

Baseline Data for Experimental Package Samples After Sterilization;
*No fiber tear or delamination was noted for these samples.

In this regard, the inclusion of an ethylene/propylene copolymer (e.g., a compatibilizer as described herein) in the sheath component and/or the core component of the bicomponent filaments forming the nonwoven fabric (e.g., after smooth calendering) has produced quality seams that peeled more cleanly than for media not including such copolymer(s) (e.g., a compatibilizer as described herein) especially when the two materials are sealed together in an appropriate temperature range for these materials. Accordingly, the adhesion between the sheath component and the core component has been strengthened and reduces the tendency of filaments or filament sheath components to be pulled away from the material when the seal of the package is peeled.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
at least a first nonwoven layer comprising multi-component fibers densely arranged and compacted against one another to form a substantially smooth outer surface on at least a first side of the nonwoven fabric;
the multi-component fibers comprising at least a first component comprising a first polymeric material including a first polyolefin having from 50% to 100% by weight of ethylene monomer units and a first compatibilizer, and a second component comprising a second polymeric material including a second polyolefin; wherein the first polymeric material is different than the second polymeric material;
wherein the first compatibilizer consists of a copolymer having a comonomer, wherein the copolymer has a comonomer content including (i) amorphous ethylene regions in an amount from at least 10% to about 90% by weight of the first compatibilizer and (ii) crystalline polypropylene regions in an amount of at least 10% to about 90% by weight of the first compatibilizer.

2. The nonwoven fabric of claim 1, wherein the multi-component fibers comprise a sheath/core configuration, a side-by-side configuration, a pie configuration, an islands-in-the-sea configuration, a multi-lobed configuration, or any combinations thereof.

3. The nonwoven fabric of claim 2, wherein the multi-component fibers comprise bicomponent fibers having a sheath/core configuration.

4. The nonwoven fabric of claim 3, wherein the first polymeric material defines the sheath component and has a first melting point, the second polymeric material defines the core component and has a second melting point, wherein the first melting point is lower than the second melting point.

5. The nonwoven fabric of claim 4, wherein the second polymeric material comprises from about 50% to about 100% by weight of propylene monomer units.

6. The nonwoven fabric of claim 1, wherein the first polymeric material includes the first compatibilizer in an amount from about 0.1% to about 50% by weight of the first polymeric material.

7. The nonwoven fabric of claim 1, wherein the copolymer has a comonomer content including (i) amorphous ethylene regions in an amount from at least 25% to about 75% by weight of the first compatibilizer of the first monomer corresponding to the first polyolefin and (ii) crystalline polypropylene regions in an amount of at least 25% to about 75% by weight of the first compatibilizer.

8. The nonwoven fabric of claim 1, wherein the first compatibilizer is an olefinic random copolymer or an olefinic block copolymer.

9. The nonwoven fabric of claim 1, wherein the copolymer is formed from a single-site catalyst.

10. The nonwoven fabric of claim 1, wherein the multi-component fibers comprise meltspun fibers, staple fibers, or a combination thereof.

11. The nonwoven fabric of claim 1, wherein the nonwoven fabric comprises the first nonwoven layer and at least a second nonwoven layer; wherein the second nonwoven layer comprise a meltblown layer or a spunbond layer.

12. A method of forming a nonwoven fabric, comprising:
    (i) forming or providing at least one nonwoven layer including a first nonwoven layer comprising multi-component fibers; the multi-component fibers comprising at least a first component comprising a first polymeric material including a first polyolefin having from 50% to 100% by weight of ethylene monomer units and a first compatibilizer, and a second component comprising a second polymeric material including a second polyolefin;
    wherein the first polymeric material is different than the second polymeric material; and wherein the first compatibilizer consists of a copolymer, wherein the copolymer has a comonomer content including (i) amorphous ethylene regions in an amount from at least 10% to about 90% by weight of the first compatibilizer and (ii) crystalline polypropylene regions in an amount of at least 10% to about 90% by weight of the first compatibilizer; and
    (ii) forming the nonwoven fabric comprising a step of calendaring the at least one nonwoven layer to compact the multi-component fibers against one another forming a substantially smooth outer surface in the form a microporous film that permits gas to pass therethrough while also serving as a barrier to bacteriological contamination.

13. A package, comprising:
    a sealed or sealable container comprising an interior defined at least in part by a container-wall, wherein at least a portion of the sealed or sealable container comprises a breathable material through which a sterilizing gas can pass into and out of the interior of the sealed or sealable container, and wherein the breathable material comprises a nonwoven fabric including at least a first nonwoven layer comprising multi-component fibers densely arranged and compacted against one another to form a substantially smooth outer surface on at least a first side of the nonwoven fabric;
    wherein the multi-component fibers comprise at least a first component comprising a first polymeric material including a first polyolefin having from 50% to 100% by weight of ethylene monomer units and a first compatibilizer, and a second component comprising a second polymeric material including a second polyolefin that is different than the first polymeric material;
    wherein the first compatibilizer consists of a copolymer, wherein the copolymer has a comonomer content including (i) amorphous ethylene regions in an amount from at least 10% to about 90% by weight of the first compatibilizer and (ii) crystalline polypropylene regions in an amount of at least 10% to about 90% by weight of the first compatibilizer.

14. The package of claim 13, further comprising a sealing film disposed on the container-wall, on a portion of the breathable material, or both; wherein the breathable material is sealed to the container wall via the sealing film.

15. The package of claim 14, wherein the package comprises (i) a sealing film-to-container wall bond having a first bond strength and (ii) a sealing film-to-breathable material bond having a second bond strength; wherein the first bond strength is greater than the second bond strength; and wherein the package comprises (i) a flexible package and the breathable material defines a window portion of the flexible package or (ii) a rigid package and the breathable material defines a lid or flexible portion of the rigid package that can be peeled off.

16. A method of sterilizing a package, comprising:
    (i) providing a package according to claim 13;
    (ii) placing the package in an air chamber;
    (iii) evacuating the air out of the air chamber and the package;
    (iv) filling the air chamber and package with a sterilizing gas;
    (v) allowing the sterilizing gas to remain within the air chamber and package for a predetermined period of time; and
    (vi) evacuating the sterilizing gas.

17. The nonwoven fabric of claim 1, wherein
    (i) the second polymeric material comprises from about 50% to about 100% by weight of propylene monomer units and defines a core component of the multicomponent fibers, and wherein the second polymeric material includes a second compatibilizer consisting of a second comonomer content including amorphous ethylene regions in an amount from 10 to 25% by weight of the second compatibilizer, and
    (ii) the first polymeric material defines a sheath component of the multicomponent fibers and the first compatibilizer consists of an EP-iPP diblock polymer having an ethylene content from 40 to 60% by weight of the EP-iPP diblock polymer.

18. The nonwoven fabric of claim 17, wherein the first polymeric material has from 0.1 to 15% by weight of the first compatibilizer.

19. The nonwoven fabric of claim 17, wherein the second polymeric material has from 0.1 to 15% by weight of the second compatibilizer.

20. A nonwoven fabric, comprising:
    at least a first nonwoven layer comprising multi-component fibers densely arranged and compacted against one another to form a substantially smooth outer surface on at least a first side of the nonwoven fabric;
    the multi-component fibers comprising at least a first component comprising a first polymeric material including a first polyolefin having from 50% to 100% by weight of ethylene monomer units, and a second component comprising a second polymeric material including a second polyolefin and a second compatibilizer; wherein the first polymeric material is different than the second polymeric material;
    wherein the second compatibilizer consists of a copolymer, wherein the copolymer has a comonomer content including (i) amorphous ethylene regions in an amount from at least 10% to about 90% by weight of the second compatibilizer and (ii) crystalline polypropylene regions in an amount of at least 10% to about 90% by weight of the second compatibilizer.

* * * * *